(12) United States Patent
Ito

(10) Patent No.: US 11,283,945 B2
(45) Date of Patent: Mar. 22, 2022

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Naoya Ito, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/521,686

(22) Filed: Jul. 25, 2019

(65) Prior Publication Data
US 2020/0092429 A1 Mar. 19, 2020

(30) Foreign Application Priority Data

Sep. 18, 2018 (JP) .............................. JP2018-173816

(51) Int. Cl.
*H04N 1/00* (2006.01)
*G06T 5/00* (2006.01)

(52) U.S. Cl.
CPC ..... *H04N 1/00413* (2013.01); *H04N 1/00183* (2013.01); *G06T 5/00* (2013.01); *G06T 2207/20092* (2013.01)

(58) Field of Classification Search
None
See application file for complete search history.

(56) References Cited

U.S. PATENT DOCUMENTS 5,687,303 A * 11/1997 Motamed .............. G06F 3/1297
345/619
6,055,327 A * 4/2000 Aragon .................. G06K 9/033
382/138
(Continued)

FOREIGN PATENT DOCUMENTS

| CN | 1524376 A | 8/2004 |
| CN | 107615743 A | 1/2018 |

(Continued)

OTHER PUBLICATIONS

Iida et al., "Search small visors, Gmail, maps, calendars, and calendars Google drive etc.", Google Service, Mac people, Feb. 28, 2014, pp. 103-103, vol. 20, No. 4, Kadokawa, Japan.

(Continued)

*Primary Examiner* — Anh-Vinh Thi Nguyen
(74) *Attorney, Agent, or Firm* — Studebaker & Brackett PC

(57) ABSTRACT

Provided are an image processing apparatus in which it is possible to appropriately correct an image at a more appropriate timing, an image processing method, a program causing a computer to perform the image processing method, and a recording medium in which the program is recorded. The image processing apparatus includes an image input receiving unit that receives an input of an image captured by a user, a correction rule setting unit that sets a correction rule for the input image in accordance with supplementary information regarding the input image in a case where the image input receiving unit receives the input of the image, and a correction suggestion unit that suggests, to the user, correction of the image, to which the correction rule is applied, in a case where the correction rule setting unit sets the correction rule.

15 Claims, 10 Drawing Sheets

(56) References Cited

U.S. PATENT DOCUMENTS

| | | | |
|---|---|---|---|
| 6,469,705 B1* | 10/2002 | Belley | G06F 12/0897 345/557 |
| 6,563,596 B1* | 5/2003 | Narushima | H04N 1/00002 358/1.14 |
| 7,340,104 B2* | 3/2008 | Fukuda | G06T 5/008 382/254 |
| 7,659,924 B2* | 2/2010 | Kagaya | H04N 1/00278 348/222.1 |
| 9,594,534 B2* | 3/2017 | Sasaki | H04N 1/00145 |
| 9,888,152 B2* | 2/2018 | Itagaki | H04N 1/6019 |
| 10,467,518 B1* | 11/2019 | Schweinfurth | G06K 19/07758 |
| 2001/0043345 A1* | 11/2001 | Rumph | G06K 15/1848 358/1.9 |
| 2002/0027669 A1* | 3/2002 | Nagatomi | H04N 1/40006 358/1.9 |
| 2002/0102526 A1* | 8/2002 | Tsukamoto | G09B 7/00 434/362 |
| 2002/0131652 A1* | 9/2002 | Yoda | G06T 5/00 382/309 |
| 2004/0021884 A1* | 2/2004 | Hanamoto | H04N 1/6027 358/1.9 |
| 2004/0109614 A1* | 6/2004 | Enomoto | H04N 1/624 382/275 |
| 2004/0150726 A1* | 8/2004 | Gallagher | H04N 1/00167 348/222.1 |
| 2004/0189813 A1* | 9/2004 | Tanaka | G06F 16/58 348/207.99 |
| 2004/0257601 A1* | 12/2004 | Tomiyasu | G06K 7/0008 358/1.9 |
| 2005/0041114 A1* | 2/2005 | Kagaya | H04N 1/00278 348/222.1 |
| 2005/0046724 A1* | 3/2005 | Kagaya | H04N 1/00167 348/333.01 |
| 2005/0073593 A1* | 4/2005 | Takasumi | H04N 1/32112 348/231.3 |
| 2005/0146639 A1* | 7/2005 | Onuki | H04N 1/00429 348/371 |
| 2005/0243352 A1* | 11/2005 | Fujiwara | H04N 1/6027 358/1.9 |
| 2006/0077458 A1* | 4/2006 | Miyazaki | H04N 1/00461 358/1.15 |
| 2006/0093213 A1* | 5/2006 | Steinberg | G06T 5/005 382/167 |
| 2006/0209346 A1* | 9/2006 | Nakahara | H04N 1/40062 358/3.06 |
| 2009/0028537 A1* | 1/2009 | Tamura | H04N 5/23258 396/55 |
| 2009/0116471 A1* | 5/2009 | Guichard | H04N 1/00318 370/350 |
| 2009/0141304 A1* | 6/2009 | Suzuki | G06T 1/0007 358/1.15 |
| 2010/0045802 A1* | 2/2010 | Oda | H04N 5/3572 348/207.2 |
| 2010/0080486 A1* | 4/2010 | Maresch | H04N 1/00206 382/266 |
| 2010/0128314 A1* | 5/2010 | Loce | G06T 5/003 358/3.06 |
| 2011/0228075 A1* | 9/2011 | Madden | G03B 15/05 348/81 |
| 2013/0120592 A1* | 5/2013 | Bednarczyk | H04N 21/41407 348/207.1 |
| 2013/0235223 A1* | 9/2013 | Park | H04N 5/23222 348/218.1 |
| 2013/0235224 A1* | 9/2013 | Park | H04N 5/2621 348/218.1 |
| 2014/0010465 A1* | 1/2014 | Mochizuki | G06K 9/6267 382/224 |
| 2014/0099026 A1* | 4/2014 | Krishnaswamy | H04N 1/6072 382/167 |
| 2014/0193047 A1* | 7/2014 | Grosz | G06Q 10/10 382/118 |
| 2015/0138595 A1* | 5/2015 | Sugimoto | G06K 9/00671 358/1.15 |
| 2016/0012322 A1* | 1/2016 | Iwata | G06K 15/4055 358/1.2 |
| 2016/0048739 A1* | 2/2016 | Burg | H04N 9/735 382/128 |
| 2017/0006184 A1* | 1/2017 | Arnabat Benedicto | H04N 1/00411 |
| 2017/0178060 A1* | 6/2017 | Schwartz | G06K 9/6267 |
| 2017/0178227 A1* | 6/2017 | Graham | G06Q 10/087 |
| 2018/0077298 A1 | 3/2018 | Matsunaga | |
| 2018/0247094 A1* | 8/2018 | Khojastepour | G01S 13/36 |
| 2018/0260759 A1* | 9/2018 | Bencke | G06T 7/10 |
| 2019/0301941 A1* | 10/2019 | Kawabata | G01J 3/524 |
| 2020/0085382 A1* | 3/2020 | Taerum | G06N 3/084 |
| 2020/0111261 A1* | 4/2020 | Fang | G06T 7/00 |
| 2020/0184278 A1* | 6/2020 | Zadeh | G06F 16/953 |
| 2020/0186766 A1* | 6/2020 | Toriihara | H04N 9/3182 |
| 2021/0224945 A1* | 7/2021 | Okuyama | H04N 9/8042 |

FOREIGN PATENT DOCUMENTS

| | | |
|---|---|---|
| EP | 1 427 190 A1 | 6/2004 |
| JP | 2005-208884 A | 8/2005 |
| JP | 2006-107291 A | 4/2006 |
| JP | 2006-323580 A | 11/2006 |
| JP | 2007-116291 A | 5/2007 |
| JP | 2015-154244 A | 8/2015 |
| JP | 2015-177362 A | 10/2015 |
| JP | 2017-067945 A | 4/2017 |

OTHER PUBLICATIONS

An Office Action; "Notice of Reasons for Refusal", dated by the Japanese Patent Office on Aug. 31, 2021, which corresponds to Japanese Patent Application No. 2018-173816 and is related to U.S. Appl. No. 16/521,686; with English language translation.

An Office Action mailed by China National Intellectual Property Administration dated Dec. 9, 2021, which corresponds to Chinese Patent Application No. 201910771881.X and is related to U.S. Appl. No. 16/521,686; with English language translation.

* cited by examiner

FIG. 3

| TAG INFORMATION | KIND | CORRECTION RULE | APPLIED USER |
|---|---|---|---|
| LANDSCAPE | FIRST TAG INFORMATION | Dynamic | all |
| FOOD | FIRST TAG INFORMATION | Retro | all |
| MOUNTAIN | SECOND TAG INFORMATION | Retro | USER A |
| SEA | SECOND TAG INFORMATION | Instant | USER B |
| BUILDING | SECOND TAG INFORMATION | Black & White | USER B |
| CHIMPANZEE | SECOND TAG INFORMATION | Glitter | USER C |
| CAT | SECOND TAG INFORMATION | Black & White | USER C |
| RAMEN | SECOND TAG INFORMATION | Instant | USER D |

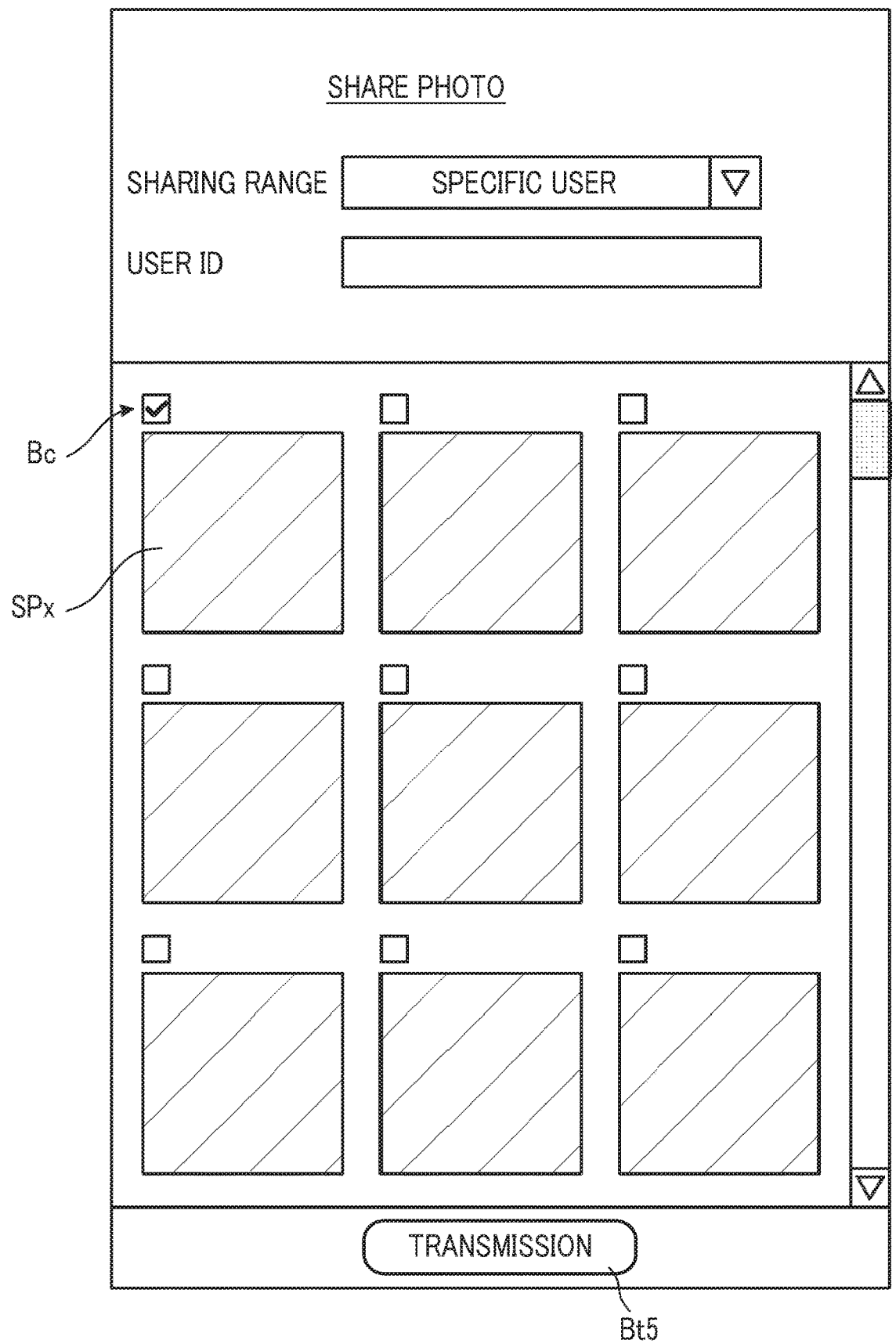

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2018-173816, filed on Sep. 18, 2018. Each of the above application(s) is hereby expressly incorporated by reference, in its entirety, into the present application.

BACKGROUND OF THE INVENTION

1. Field of the Invention

The present invention relates to an image processing apparatus, an image processing method, a program, and a recording medium for receiving an input of an image captured by a user and suggesting correction of the input image.

2. Description of the Related Art

A technique of sharing an image (strictly, image data) captured by a user with other users via a network or releasing the image to many users is already known. In a case where an attempt to share and releasing the image is performed, the user may correct (including processing) the image. In image correction, the user sets the correction such that display image quality of the image becomes desired image quality, and then, image correction is performed under the setting.

In recent years, a technology of smoothly performing image correction has been developed. As an example, JP2006-323580A discloses a technology of smoothly processing plural pieces of image data having the same features. Specifically, an image processing method disclosed in JP2006-323580A includes a step of detecting a user, a step of detecting a feature of image data, a step of performing processing (specifically, correction processing and processing) on the image data, a step of storing details of the processing designated for the image by the detected user, in association with detection information of the user and the feature of the image data. According to such an image processing method, when the same user performs processing on predetermined image data, processing stored in association with the detection information of the same user and features of image data having the same features as those of the predetermined image data can be selected. Thus, the user does not have necessary to designate processing for each piece of image data, and thus, it is possible to smoothly process plural pieces of image data having the same features in accordance with the preference of the user.

As another example, JP2015-154244A is exemplified. JP2015-154244A discloses an image processing system in which correction of an image, which corresponds to the needs and preferences of a user is easily performed. In the system, recommended correction information obtained based on supplementary information of an image as a correction target among pieces of correction information accumulated in the server is transmitted from the server, and an image processing apparatus corrects the image based on the received recommended correction information. According to such a system, it is possible to appropriately correct an image based on recommended correction information corresponding to the image as a correction target among various pieces of correction information.

SUMMARY OF THE INVENTION

According to the technologies in JP2006-323580A and JP2015-154244A, as described above, although smooth and appropriate image correction is realized, development of an image processing apparatus in which convenience is more improved in a scene of image correction, in consideration of user-friendliness, is required.

Specifically, in the image processing method disclosed in JP2006-323580A, details of correction processing or processing are selected at a timing at which the user is detected, and features are detected in image data, and processing having the selected details is automatically performed on the image data. In the image processing system disclosed in JP2015-154244A, if the user transmits supplementary information of an original image and information of a specific correction intention, and the server receives these pieces of information, at this timing, recommended correction information is transmitted from the server, and the image processing apparatus receives the recommended correction information so as to correct the original image.

In comparison to image correction disclosed in JP2006-323580A and JP2015-154244A, it is required to correct an image at the more appropriate timing, in particular, at a suitable timing in a relation with an input of an image (for example, uploading of an image to the server).

The present invention has been made in view of the above-described circumstances, so as to achieve an object as follows.

The object of the present invention is to provide an image processing apparatus in which the problems in the related art are solved, and it is possible to appropriately correct an image at a more appropriate timing, an image processing method, a program causing a computer to perform the image processing method, and a recording medium in which the program is recorded.

To achieve the above object, according to the present invention, an image processing apparatus includes an image input receiving unit that receives an input of an image captured by a user, a correction rule setting unit that sets a correction rule for the input image in accordance with supplementary information regarding the input image in a case where the image input receiving unit receives the input of the image, and a correction suggestion unit that suggests, to the user, correction of the image, to which the correction rule is applied, in a case where the correction rule setting unit sets the correction rule.

In the image processing apparatus configured as described above, in a case where the input of the image is received, the correction rule for the input image is set by using the case as a trigger, and the correction of the input image, to which the set correction rule is applied, is suggested. According to such a configuration, it is possible to appropriately correct an image at a more appropriate timing.

Here, preferably, the image processing apparatus further includes an image correction unit that performs the correction of the image, to which the correction rule is applied. Preferably, the correction suggestion unit recognizes whether or not the user permits the correction of the image, which has been suggested by the correction suggestion unit, and the image correction unit performs the correction of the image, which has been suggested by the correction suggestion unit, only in a case where the correction suggestion unit recognizes the permission of the user for the correction of the image, which has been suggested by the correction suggestion unit.

In the image processing apparatus, preferably, in a case where the correction suggestion unit suggests, to the user, the correction of the image, to which the correction rule is applied, the correction suggestion unit displays a corrected image in a case where correction to which the correction rule is applied has been performed.

In the image processing apparatus, preferably, in a case where the correction suggestion unit suggests, to the user, the correction of the image, to which the correction rule is applied, the correction suggestion unit displays character string information corresponding to contents of the correction rule.

Preferably, the image processing apparatus further includes a tag information assigning unit that analyzes the input image to specify an object in the image and assigns tag information corresponding to the object to the input image as the supplementary information, wherein, in a case where the image input receiving unit receives the input of the image. Preferably, the correction rule setting unit sets the correction rule for the input image, in accordance with the tag information assigned to the input image.

Preferably, the image processing apparatus further includes a correction rule storage unit that stores the correction rule which has been previously prepared, in association with the tag information. Preferably, the correction rule setting unit stores the correction rule associated with tag information which coincides with the tag information assigned to the input image among correction rules stored in the correction rule storage unit, as the correction rule for the input image.

In this case, a correction rule associated with the tag information assigned to the input image is selected among correction rules which have been previously prepared, and image correction by applying the selected correction rule is performed.

In the image processing apparatus, preferably, the tag information includes first tag information indicating attributes of the object and second tag information indicating attributes of the object, which are more specific than the first tag information. Preferably, the correction rule associated with the first tag information and the correction rule associated with the second tag information are stored in the correction rule storage unit.

In the image processing apparatus, preferably, in a case where both the first tag information and the second tag information are assigned to the input image, and each of the first tag information and the second tag information assigned to the input image coincides with the tag information associated with the correction rule stored in the correction rule storage unit, the correction rule setting unit sets the correction rule associated with the second tag information which coincides with the second tag information assigned to the input image among correction rules stored in the correction rule storage unit, as the correction rule for the input image.

In this case, in a case where both the correction rule associated with the first tag information and the correction rule associated with the second tag information are provided as candidates, the correction rule associated with the second tag information is preferentially employed.

In the image processing apparatus, preferably, the correction rule associated with the second tag information is stored in the correction rule storage unit for each user.

Preferably, the image processing apparatus further includes a mode switching unit that switches a mode in which the correction rule setting unit sets the correction rule. Preferably, the mode switching unit switches the mode between an automatic mode and a manual mode, the automatic mode in which the correction rule setting unit automatically sets the correction rule, and the manual mode in which the correction rule setting unit sets the correction rule in accordance with an instruction of the user. Preferably, in a case where the mode is the automatic mode, in a case where the tag information assigned to the input image coincides with the tag information associated with the correction rule stored in the correction rule storage unit, the correction rule setting unit sets the correction rule associated with the tag information which coincides with the tag information assigned to the input image among the correction rules stored in the correction rule storage unit, as the correction rule for the input image.

Preferably, the image processing apparatus further includes a correction rule addition unit that adds a correction rule to be stored in the correction rule storage unit. Preferably, in a case where the correction rule set by the correction rule setting unit in which the mode is the manual mode is set to a target correction rule, and the tag information assigned to the image corrected by applying the target correction rule is set to target tag information, the correction rule addition unit stores the target correction rule satisfying Condition 1, in the correction rule storage unit, in association with the target tag information satisfying Condition 2.

Condition 1: the number of a plurality of the images corrected by applying the same target correction rule is equal to or more than a threshold Condition 2: the number of times of assigning the same target tag information to the plurality of the images corrected by applying the target correction rule satisfying Condition 1 is equal to or more than the threshold In this case, in a case where the correction rule set by the user in a case where the mode is in the manual mode is applied predetermined times or more in correction of the image to which the same tag information is assigned, the correction rule is stored, and thus it is possible to use the correction rule in the subsequent image correction.

Preferably, the image processing apparatus further includes a selection operation receiving unit that receives a selection operation of the user for whether or not correction to which the correction rule is applied is required, for each correction rule. Preferably, in a case where the selection operation receiving unit receives the selection operation indicating that the correction is not required, for the correction rule set by the correction rule setting unit, the correction of the image, in which the correction rule set by the correction rule setting unit is applied, is not performed.

In the image processing apparatus, the image input receiving unit may receive the input of the image for a post on a social network service.

In this case, the input image is corrected in a case where the image for a post on the social network service is input.

Preferably, the image processing apparatus further includes a reverse correction unit that restores the image corrected by applying the correction rule corresponding to the supplementary information, to the image before the correction.

In this case, it is possible to restore an image which has been corrected once, to an original state (image before correction).

To achieve the above-described object, according to the present invention, there is provided an image processing method including receiving an input of an image captured by a user, by an image input receiving unit, setting a correction rule for the input image in accordance with supplementary information regarding the input image by a correction rule setting unit in a case where the image input receiving unit receives the input of the image, and suggesting, to the user, correction of the image, to which the correction rule is applied, by a correction suggestion unit in a case where the correction rule setting unit sets the correction rule.

Preferably, the image processing method further includes performing the correction of the image, to which the correction rule is applied, by an image correction unit. Preferably, in the suggesting of the correction of the image, it is recognized whether or not the user permits the correction of the image, which has been suggested by the correction suggestion unit, and, only in a case where it is recognized that the user permits the correction of the image, which has been suggested by the correction suggestion unit, the correction of the image, to which the correction rule is applied, is performed.

Preferably, the image processing method further includes analyzing the input image to specify an object in the image in a case where the image input receiving unit receives the input of the image, and assigning tag information corresponding to the object, to the input image as the supplementary information by a tag information assigning unit.

According to the present invention, there is provided a program causing a computer to perform the image processing method.

According to the present invention, there is provided a computer-readable recording medium and stores the program causing the computer to perform the image processing method.

According to the present invention, there is provided an image processing apparatus which comprises a processor and is configured such that the processor receives an input of an image captured by a user, sets a correction rule for the input image in accordance with supplementary information regarding the input image in a case of receiving the input of the image, and suggests, to the user, correction of the image, to which the correction rule is applied, in a case of setting the correction rule.

According to the present invention, an image processing apparatus in which it is possible to appropriately correct an image at a more appropriate timing, an image processing method, a program causing a computer to perform the image processing method, and a recording medium in which the program is recorded are realized.

BRIEF DESCRIPTION OF THE DRAWINGS

FIG. 3 illustrates a table illustrating a correspondence relation between a correction rule and tag information.

FIG. 10 is a diagram illustrating an example of a sharing setting screen.

DESCRIPTION OF THE PREFERRED EMBODIMENTS

Hereinafter, an image processing apparatus, an image processing method, a program, and a recording medium according to the present invention will be described in detail based on a preferred embodiment (hereinafter, the embodiments) illustrated in the accompanying drawings. The embodiment described below is merely an example for the purpose of describing the present invention in an easy-to-understand manner, and does not limit the present invention. That is, the present invention is not limited to the embodiment described below, and various improvements or modifications can be made without departing from the spirit of the present invention. In addition, the invention includes its equivalents.

In this specification, "image" refers to image data. For example, image data of lossy compression such as joint photographic experts group (JPEG) format, or image data of reversible compression such as a graphics interchange format (GIF) or a portable network graphics (PNG) format is applicable.

Outline of Image Processing Apparatus

Figure 1:
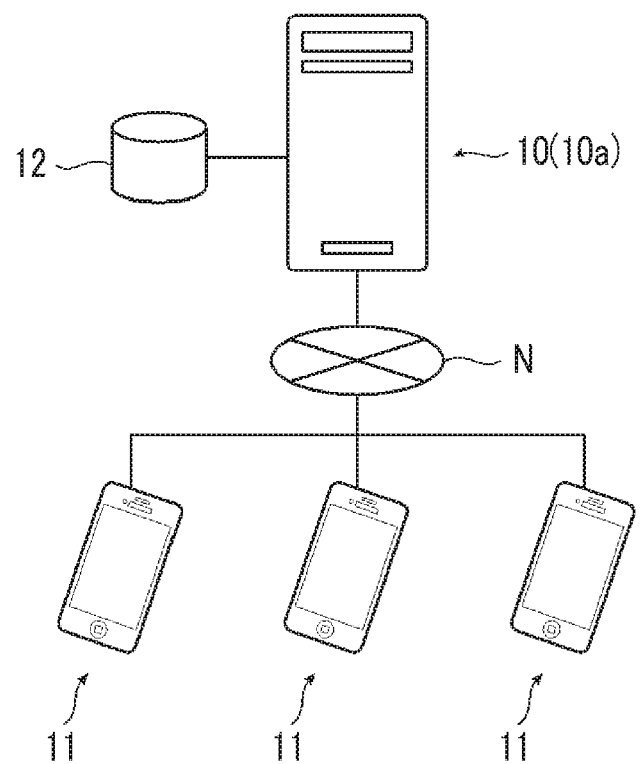
FIG. 1 is a diagram illustrating an image processing apparatus and a related device.

An outline of an image processing apparatus 10 according to the embodiment will be described with reference to FIG. 1. FIG. 1 is a diagram illustrating the image processing apparatus 10 and related devices. For easy illustrations, in FIG. 1, the number of user terminals 11 connected to the image processing apparatus 10 via a network N is three. However, the number of user terminals 11 may have any value.

As illustrated in FIG. 1, the image processing apparatus 10 according to the embodiment is connected to at least one or more user terminals 11 via the network N such as the Internet connection or a mobile communication line, so as to allow communication. The image processing apparatus 10 is a computer as a server. The user terminal 11 is a terminal as a client. In the embodiment, the image processing apparatus 10 receives an input (uploading) of an image from the user terminal 11 and accumulates the input image. The image processing apparatus 10 has a function of correcting the input image.

The image processing apparatus 10 comprises a processor and performs the function in a manner that the processor reads an image processing program and performs various types of data processing. The image processing program defines a command for causing a computer constituting the image processing apparatus 10 to performing a function as the image processing apparatus 10. The image processing program is stored in a storage device (not illustrated) of the image processing apparatus 10. The storage device refers to a storage medium of a hardware form that stores the image processing program, data required for executing the image processing program, data generated by executing the image processing program, and the like. The storage device includes the main storage device and an external storage device. For example, as the main storage device, a read only memory (ROM), a random access memory (RAM), a dynamic random access memory (DRAM), a static random access memory (SRAM), or the like is provided. However, the main storage device is not limited thereto. For example, as the external storage device, a hard disk, an optical device such as a compact disc read only memory (CD-ROM) and a digital versatile disk (DVD), a flash memory, and a magnetic tape are provided. However, the external storage device is not limited thereto.

A user can use a service provided by the image processing apparatus 10, with the user terminal 11. The user terminal 11 is configured by a personal computer (PC), a tablet terminal, a smart phone, or a portable phone, for example. The user terminal 11 includes an input device such as a keyboard, a mouse, and a touch panel, a display device such as a liquid crystal display and the touch panel, and a communication device such as a communication interface provided for communicating with the image processing apparatus 10. The user terminal 11 comprises a data processing unit (user terminal-side processor) that performs data processing and the like in response to an input operation of the user.

Regarding the service provided by the image processing apparatus 10, the image processing apparatus 10 acquires an image input (uploaded) by the user with the user terminal 11 and accumulates the input image in a database 12. Here, the input image means an image captured by the user with an imaging device such as a camera mounted in the user terminal 11, an image taken into the user terminal 11 after being obtained by imaging of the user with another imaging device, and the like.

An input from each user terminal 11 and an image obtained by performing predetermined image processing (for example, correction processing described later) on the image input from each user terminal 11 are accumulated in the database 12 for each user.

The database 12 may be provided in the image processing apparatus 10 or may be constructed in an external computer connected to the image processing apparatus 10.

According to the function of the image processing apparatus 10, a user can view an image input (uploaded) by the user, with the user terminal 11. The image processing apparatus 10 can display an image input by one user, in a user terminal 11 of another user designated by the one user. That is, each user can share an image input (uploaded) by the user, with another user by the function of the image processing apparatus 10.

The image processing apparatus 10 assigns tag information to the input image in a case where accumulating the input image in the database 12. The tag information is information indicating attributes such as a category and a theme of an object in the image, for example. Image management for the user is easily performed by assigning the tag information to the input image. Specifically, in a case where an image to be displayed in the user terminal 11 is extracted from images accumulated in the database 12, the user can easily extract the image by using the tag information as a clue.

The image processing apparatus 10 can correct the input image and an image designated from the database 12. The correction refers to correction to image quality of an image. Specifically, the correction is processing of changing the tone, the hue, the brightness, the luminance, the chroma, and the texture (for example, glossiness) of an object in an image, in accordance with the set correction rule.

In the embodiment, the corrected image obtained by correcting the input image can be accumulated in the database 12. Thus, the user can use the corrected image in a case of viewing the image in the database 12 and in a case of sharing the image with another user.

In the embodiment, in a case where image correction is performed, the correction rule is set, and image correction is performed by applying the set correction rule. In more detail, one correction rule is employed among plural types of correction rules which is prepared in advance, and image correction is performed by applying the employed correction rule.

Image Correction

Image correction will be described below. In the following descriptions, for easy descriptions to understand, descriptions will be made by using five types of correction rules as specific examples of the correction rule.

1) Correction rule (described as "Dynamic" below) that produces visual effects causing an object to appear more dynamic 2) Correction rule (described as "Retro" below) that produces visual effects causing an object to appear more retro (old-fashioned)

3) Correction rule (described as "Black&White" below) that makes an image a gray scale image 4) Correction rule (described as "Glitter" below) that produces visual effects causing the sense of luminance of an object to increase 5) Correction rule (described as "Instant" below) that produces visual effects that reproduce image quality in a case where an image is captured by an instant camera Here, the correction rule means an image processing filter (spatial processing filter) for changing image quality. That is, image correction means filtering processing by an image processing filter.

Regarding the amount of changing the tone, the hue, the brightness, the luminance, the chroma, and the texture in each of the five kinds of correction rules, default values are set in advance. However, the above amounts thereof may be appropriately changed from the default values by the user.

The correction rule is not limited to the above five types, and may include a correction rule other than the above five types.

The title of the correction rule may be set in accordance with the corrected quality (appearance), for example, "Retro" and "Glitter". The title of the correction rule may be represented by specific correction details, the change amount, and the like, for example, "contrast+2".

In the embodiment, in a case where an image is input (uploaded) from the user terminal 11, and the image processing apparatus 10 receives the input image, data processing relating to image correction is started by using this case as a trigger. Regarding a mode of image correction, an automatic mode and a manual mode can be selected. In a case where the automatic mode is selected, the correction rule is automatically determined in accordance with an object (subject) in the input image. More strictly, tag information corresponding to the object is assigned to the input image, and then the correction rule in accordance with the tag information is set. For example, Correction rule "Dynamic" may be set in an image to which tag information of "scenery" is assigned. Correction rule "Retro" may be set in an image to which tag information of "food" is assigned.

In a case where the manual mode is selected, the user selects one from the five types of correction rules, and the correction rule selected by the user is set as a correction rule to be applied at time of image correction. In the manual mode, in a case where image correction to which the same correction rule is applied for images to which the same tag information (specifically, second tag information described later) is assigned is performed predetermined times or more, this correction rule is set as a correction rule (frequent correction rule) which is frequently used by the user. Thus, in the subsequent image correction (exactly, image correction in a case where the mode is the automatic mode), in a case where there is an attempt to correct an image to which the same tag information is assigned, the stored frequent correction rule is automatically set as a correction rule to be applied in image correction.

Configuration of Image Processing Apparatus

Next, a configuration of the image processing apparatus 10 according to the embodiment will be described. The image processing apparatus 10 according to the embodiment includes an image input receiving unit, a correction rule setting unit, and a correction suggestion unit (see FIG. 2 described later). The image input receiving unit receives an input (uploading) of an image captured by a user. In a case where the image input receiving unit receives the input of the image, the correction rule setting unit sets a correction rule in accordance with tag information (supplementary information) assigned to the input image, by using this case as a trigger. In a case where the correction rule setting unit sets the correction rule, the correction suggestion unit suggests correction of the input image, to which the correction rule is applied, to the user.

According to the image processing apparatus 10 configured as described above, in comparison to the image processing method and the image processing system disclosed in JP2006-323580A and JP2015-154244A, it is possible to correct an image at a more appropriate timing, in particular, at a suitable timing in a relation with the input of the image (specifically, uploading of the image to the image processing apparatus 10).

Specifically, in the image processing method disclosed in JP2006-323580A, image correction is started by detecting a user and detecting features in image data, as a trigger.

In the image processing system disclosed in JP2015-154244A, in a case where a user transmits supplementary information of an original image and information of a specific correction intention to the server, image correction is started by using this transmission as a trigger.

Regarding a timing at which image correction is performed, a timing at which an image is input is desirable. This is because the main purpose for the user to input (upload) an image is image management on the network and sharing with another user, and it is required to perform correction desired by the user at an image input time point in order to achieve such a purpose.

Thus, in the image processing apparatus 10 according to the embodiment, as described above, processing relating to image correction is performed by using reception of the input of the image as a trigger. That is, in the embodiment, since image correction is started at a timing at which an image is input, image correction is performed at a timing suitable for the user.

Figure 2:
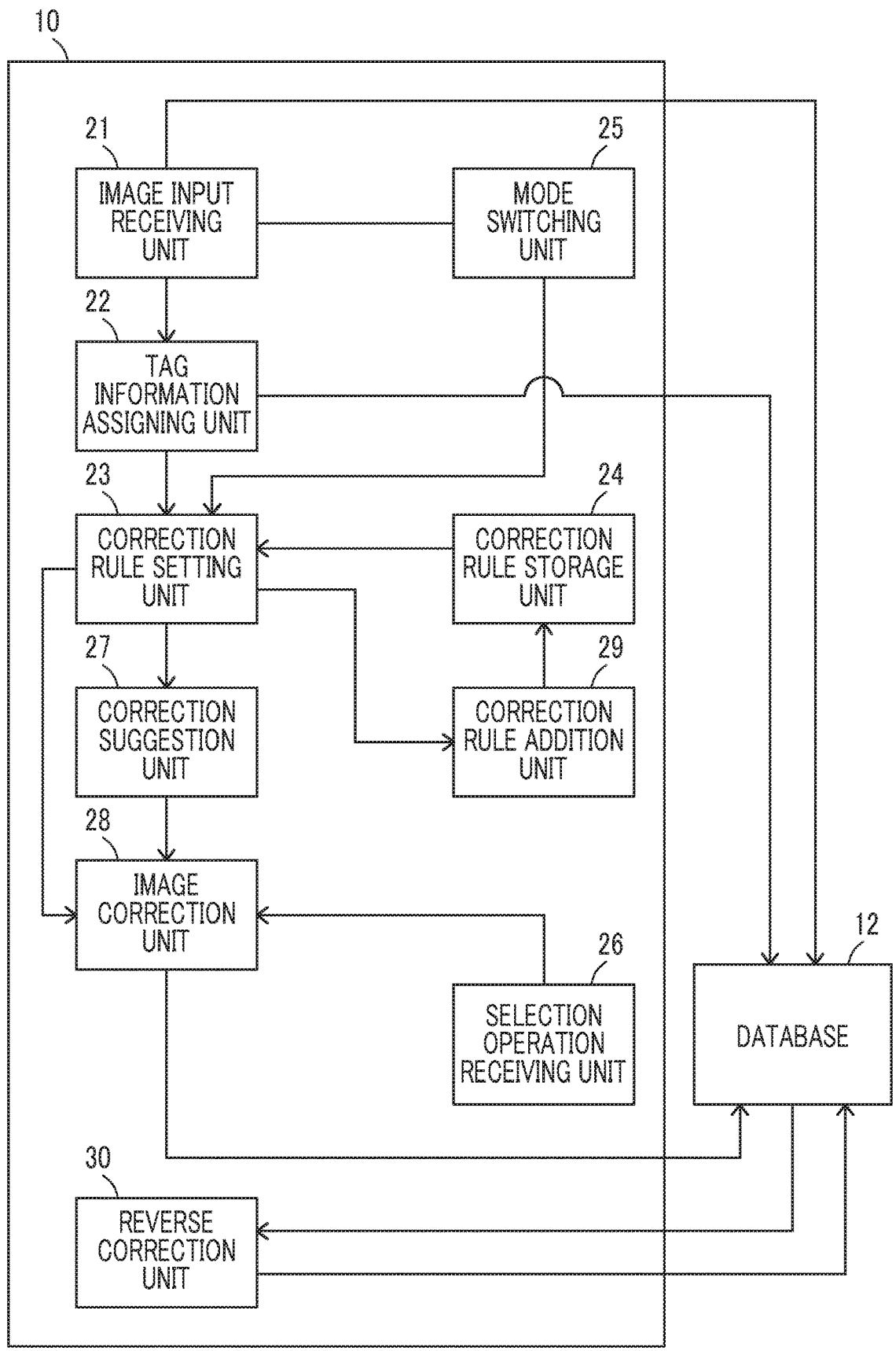
FIG. 2 is a diagram illustrating a specific configuration of an image processing apparatus according to an embodiment of the present invention.

The specific configuration of the image processing apparatus 10 will be described below with reference to FIG. 2. FIG. 2 is a block diagram illustrating the specific configuration of the image processing apparatus 10. As illustrated in FIG. 2, the image processing apparatus 10 includes an image input receiving unit 21, a tag information assigning unit 22, a correction rule setting unit 23, a correction rule storage unit 24, a mode switching unit 25, a selection operation receiving unit 26, a correction suggestion unit 27, an image correction unit 28, a correction rule addition unit 29, and a reverse correction unit 30. Among the above processing units, processing units other than the correction rule storage unit 24 are realized by cooperation of a hardware device such as a computer used as the image processing apparatus 10 with the image processing program as software. As the hardware configuration of the correction rule storage unit 24, the storage device (specifically, memory such as the ROM and the RAM) comprised by the image processing apparatus 10 may be provided. An external storage device, for example, a hard disk, a memory card, a flexible disk (FD), an optical disc such as a compact disc (CD), a DVD, and a Blu-ray disc (registered trademark), a magnetic disk, an integrated circuit (IC) card may be provided, and a storage device of another computer connected to the image processing apparatus 10 to enable communication may also be provided.

Additionally, regarding the configuration of each processing unit, in the present invention, the hardware configuration of each processing unit (specifically, each of the image input receiving unit 21, the tag information assigning unit 22, the correction rule setting unit 23, the mode switching unit 25, the selection operation receiving unit 26, the correction suggestion unit 27, the image correction unit 28, the correction rule addition unit 29, and the reverse correction unit 30) of the image processing apparatus 10 may be realized by dedicated hardware or may be made by various processors or computers executing the program.

The various processors includes a central processing unit (CPU) which is a general-purpose processor functioning as each processing unit by executing software (program), a programmable logic device (PLD) such as a field programmable gate array (FPGA), which is a processor capable of changing a circuit configuration after being manufactured, a dedicated electric circuit such as an application specific integrated circuit (ASIC), which is a processor having a circuit configuration designed to be dedicated for performing specific processing, and the like.

One processing unit may be configured by one of the various processors. Alternatively, one processing unit may be configured by a combination of two or more processors which are the same type or different types, for example, a combination of a plurality of FPGAs or a combination of an FPGA and a CPU. A plurality of processing units may be configured by one of the various processors, or two or more of the plurality of processing units may be collectively configured by one processor.

As represented by computers such as a server and a client, a form in which one processor is constituted by a combination of one or more CPUs and software, and this processor functions as the plurality of processing units is provided. This embodiment corresponds to this form.

As represented by a system on chip (SoC), a form of using a processor realizing functions in the entirety of the system including the plurality of processing units with one integrated circuit (IC) may be provided.

More specifically, the hardware configuration of the various processors corresponds to an electric circuit (circuitry) obtained by combining circuit elements such as semiconductor elements.

The processing units of the image processing apparatus in the present invention will be described below.

Image Input Receiving Unit

The image input receiving unit 21 receives an input of an image by a user with a user terminal 11, via the network N.

In one image input, at least one or more pieces of images are input. Here, "image input" corresponds to uploading of an image from the user terminal 11 to the image processing apparatus 10. The "image input" includes an input for a post on a social network service (SNS). The "image input" includes a case where at least one or more pieces of images are selected from an image group of the existing (uploaded) images accumulated in the database 12, and the selection result is transmitted from the user terminal 11 to the image processing apparatus 10.

Tag Information Assigning Unit

The tag information assigning unit 22 assigns tag information to an input image in a case where the image input receiving unit 21 receives the image input. Specifically, in a case where the image input receiving unit 21 receives the image input, the tag information assigning unit 22 performs image analysis on the input image and specifies an object in the input image. The object means a person and an item as a subject captured in an input image. In a case where the input image is a landscape picture, a place, a building, a landscape (scenery), a season at the time of capturing, and the like correspond to objects.

The image analysis means processing of analyzing contents of an image (features of image). As the image analysis, face detection, face recognition, blurring, brightness, similarity analysis, grouping of images by using a capturing time and position information such as global positioning system (GPS) information, image recognition (subject distinguishment), scene recognition, object recognition, and the like can be used. The image analysis also includes processing of analyzing metadata information (such as an exchangeable image file format (Exif)) of an image. In a case of specifying an object in the input image, the tag information assigning unit 22 can specify the object with reference to information (for example, GPS information, capturing date and time, and shutter speed) obtained from the analysis of the metadata information. The tag information assigning unit 22 can perform at least one of analysis of image contents or analysis of metadata information, as the image analysis. The tag information assigning unit 22 performs only the analysis of image contents on an image which does not have metadata information. An image analysis method is not particularly limited. Various image analysis methods including well-known methods can be used.

The tag information assigning unit 22 applies an annotation technology to the result of the image analysis and assigns tag information corresponding to the object in the input image, to the input image. In the embodiment, the tag information assigning unit 22 assigns two or more types of tag information to one image at different abstraction degrees. In detail, the tag information includes first tag information and second tag information. The first tag information indicates more abstract attributes of the object. The second tag information indicates specific attributes of the object than the first tag information. The first tag information indicates the theme (for example, "scenery", "food", and "person") of an object and is the most basic tag information. The second tag information indicates a classification category (for example, "mountain", "sea", "Chinese food", "French cuisine", "friend", and "family") or a name (for example, place name, facility name, food name, product name, and name of person) of an object. The second tag information indicates specific contents. The tag information assigning unit 22 assigns both the first tag information and the second tag information to one input image. Specifically, for example, in a case where a subject (object) in an input image is a lily (flower)", "flower" as the first tag information is set in the input image, and "lily" as the second tag information is assigned to the input image.

In the embodiment, although plural types of tag information having different abstraction degrees are assigned, at least one information may be assigned. That is, only one type of tag information may be assigned to one input image, or three types of tag information having different abstraction degrees may be assigned. The tag information assigning unit 22 may assign the name itself of an object as the tag information, or may assign a character string (for example, a keyword associated with the object name) associated with the name of the object, as tag information. Further, the tag information assigning unit 22 may assign a character string designated by the user operating the user terminal 11, as the tag information.

Correction Rule Setting Unit

In a case where the image input receiving unit 21 receives the image input (uploading), the correction rule setting unit 23 sets a correction rule to be applied in a case of correcting the input image. In the embodiment, the correction rule setting unit 23 can automatically set the correction rule for an input image, in accordance with tag information assigned to the tag information.

In detail, the correction rule setting unit 23 extracts a correction rule corresponding to tag information of an input image from plural kinds of correction rules stored in the correction rule storage unit 24. The correction rule setting unit 23 sets the extracted correction rule to a correction rule for the input image (strictly, correction rule to be applied in correction of the input image).

The correction rule storage unit 24 stores plural kinds of correction rules which has been prepared in advance, in association with tag information. More specifically, each of a correction rule associated with first tag information and a correction rule associated with second tag information is stored in the correction rule storage unit 24, in a table format illustrated in FIG. 3. FIG. 3 illustrates a table representing a correspondence relation between the correction rule and the tag information.

Among the correction rules stored in the correction rule storage unit 24, the correction rule associated with the first tag information is a basic correction rule which is used by many users as a correction rule to be applied in a case of correcting an image to which first tag information is assigned. As such a correction rule, a plurality of correction rules is prepared in advance. The correction rule associated with the second tag information is frequently used in a case of correcting an image to which the same second tag information is assigned among input images of one user. Such a correction rule is a frequent correction rule registered as a user-specific correction rule. As illustrated in FIG. 3, the frequent correction rule is stored in the correction rule storage unit 24 for each user. That is, the correction rule (frequent correction rule) associated with the second tag information is associated with a user who is a source of providing the image corrected by applying the correction rule.

The association between the second tag information, the correction rule, and the user is performed by machine learning of the image processing apparatus 10. Specifically, in a case where the same correction rule is applied, predetermined times or more, to images which are input by the same user and to which the same second tag information is assigned, this pattern is learned, and thus association between the second tag information, the correction rule, and the user is obtained. Simply, regarding a combination between the second tag information, the correction rule, and the user, a frequent pattern is specified.

Returning to the descriptions of the correction rule setting unit 23, the correction rule setting unit 23 determines whether the tag information assigned to the input image coincides with any piece of tag information associated with each of the correction rules stored in the correction rule storage unit 24. In a case where both pieces of tag information coincide with each other, the correction rule setting unit 23 sets the correction rule which is associated with tag information coinciding with the tag information assigned to the input image among the correction rules stored in the correction rule storage unit 24, as the correction rule for the input image.

In detail, in the embodiment, as described above, the tag information assigning unit 22 assigns both the first tag information and the second tag information to the input image. The correction rule setting unit 23 determines whether or not at least one of the first tag information or the second tag information assigned to the input image coincides with any piece of tag information associated with the correction rule stored in the correction rule storage unit 24. At this time, the correction rule setting unit 23 determines whether or not the second tag information assigned to the input image is associated with any of correction rules associated with the user who is the source of providing the input image.

In a case where one of the first tag information and the second tag information assigned to the input image coincides with any piece of tag information associated with the correction rule, the correction rule setting unit 23 sets the correction rule associated with the coinciding tag information, as the correction rule for the input image.

In a case where both the first tag information and the second tag information assigned to the input image coincide with the tag information associated with the correction rule, the correction rule setting unit 23 sets the correction rule associated with the second tag information which coincides with the second tag information assigned to the input image among the correction rules stored in the correction rule storage unit 24, as the correction rule for the input image. Strictly, the correction rule setting unit 23 sets the correction rule associated with the second tag information which is associated with the user who is the source of providing the input image and coincides with the second tag information assigned to the input image, as the correction rule for the input image.

As described above, in the embodiment, in a case where both the first tag information and the second tag information assigned to the input image coincide with the tag information associated with the correction rule, the correction rule associated with the second tag information is preferentially applied. In a case where this content is specifically described by using an example, for example, it is assumed that first tag information of "scenery" and second tag information of "mountain" are assigned to an image input from a user A. Here, as illustrated in FIG. 3, Correction rule "Dynamic" associated with "scenery" as the first tag information is stored in the correction rule storage unit 24. As illustrated in FIG. 3, Correction rule "Retro" associated with "mountain" as the second tag information is included in correction rules associated with the user A. In this case, not Correction rule "Dynamic" but Correction rule "Retro" is set as the correction rule for the input image.

In a case where the correction rule is set by the procedures described above, a more appropriate correction rule is set in accordance with the specific contents of the object in the input image. Therefore, image correction is more appropriately performed.

Mode Switching Unit

The mode switching unit 25 switches a mode in which the correction rule setting unit 23 sets the correction rule, between the automatic mode and the manual mode. The manual mode is a mode in which the correction rule setting unit 23 sets the correction rule in accordance with an instruction of the user. The automatic mode is a mode in which the correction rule setting unit 23 automatically sets the correction rule for the input image, in accordance with the tag information assigned to the input image.

Figure 4:
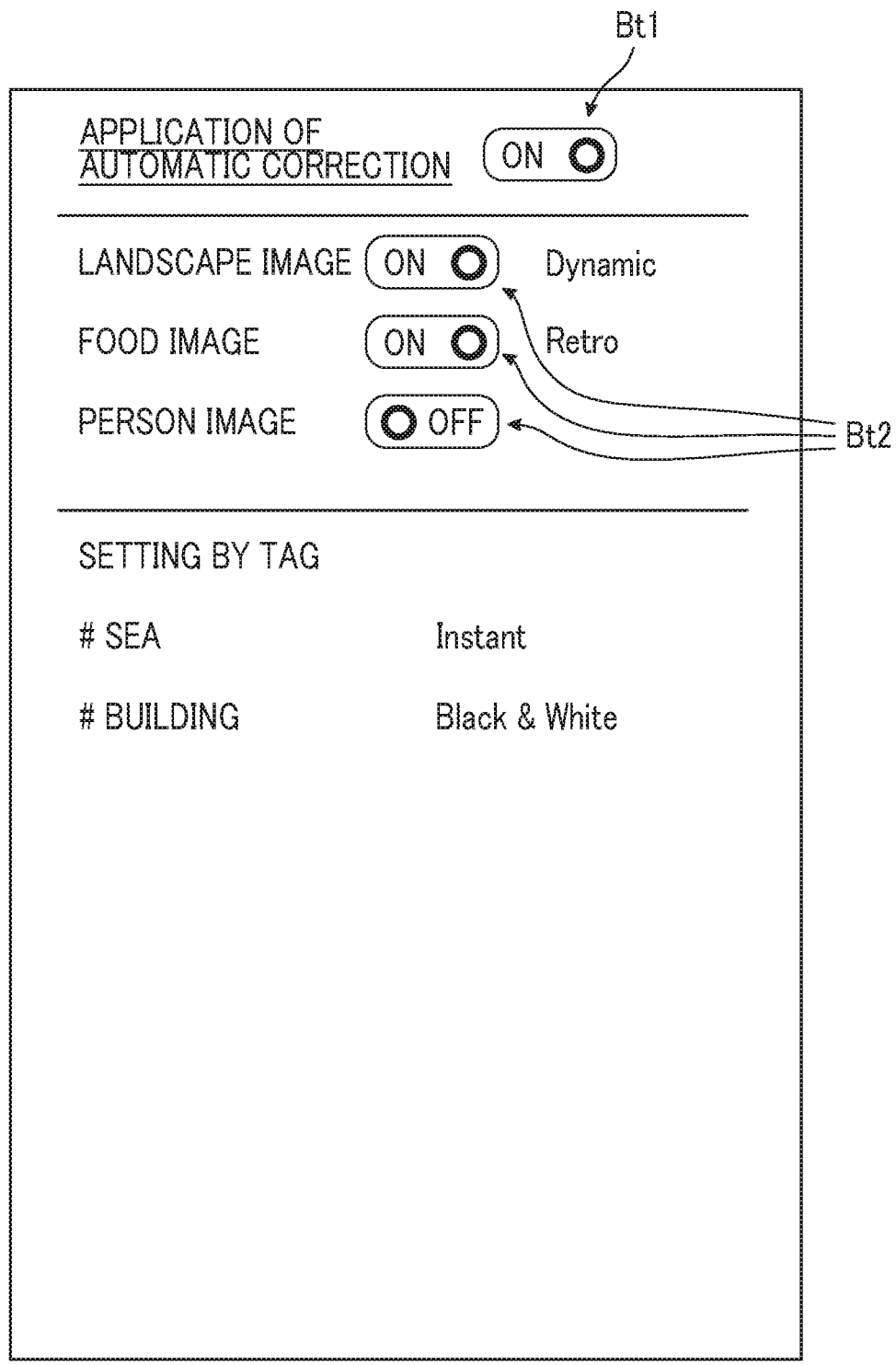
FIG. 4 is a diagram illustrating an example of a correction setting screen.

The mode can be switched by a user with a correction setting screen illustrated in FIG. 4. Specifically, the mode is switched between the automatic mode and the manual mode in a manner that a mode switching button Bt1 on the setting screen is operated in a state where the setting screen in FIG. 4 is displayed in a display of the user terminal 11. FIG. 4 is a diagram illustrating an example of the correction setting screen.

In a case where the mode is the automatic mode, as described above, in a case where the correction rule setting unit 23 sets the correction rule for the input image, the correction rule setting unit 23 determines whether or not the tag information assigned to the input image coincides with any piece of tag information associated with the correction rule stored in the correction rule storage unit 24. In a case where the tag information assigned to the input image coincides with the tag information associated with the correction rule, the correction rule setting unit 23 sets this correction rule (that is, correction rule associated with the tag information coinciding with the tag information assigned to the input image) as the correction rule for the input image.

In a case where the mode is the manual mode, the user designates one from the five types of correction rules (Dynamic, Retro, Instant, Black&White, and Glitter) with a designation screen (not illustrated). The image processing apparatus 10 is notified of the type of the correction rule designated by the user, from the user terminal 11. The correction rule setting unit 23 sets the correction rule of the type of which the image processing apparatus 10 is notified, as the correction rule for the input image.

Selection Operation Receiving Unit

The selection operation receiving unit 26 receives a selection operation of the user, which relates to whether or not correction is required. The selection operation is an operation performed for selecting whether or not image correction is performed by actually applying the correction rule which is automatically set by the correction rule setting unit 23 in a case where the mode is the automatic mode. The selection operation is performed by each user for each correction rule. Therefore, the selection operation receiving unit 26 receives the selection operation of each user for each correction rule.

Regarding descriptions of the selection operation, the user causes the display of the user terminal 11 to display the setting screen in FIG. 4 and performs the selection operation with the setting screen. In detail, a selection button Bt2 for selecting whether or not correction is performed by applying the correction rule stored in the correction rule storage unit 24 is provided on the setting screen for each correction rule. Strictly, the selection button Bt2 is provided for the correction rule associated with the first tag information among the correction rules stored in the correction rule storage unit 24. The user operates the selection button Bt2 for each correction rule associated with the first tag information, so as to select whether or not the correction rule is required. The correction rule allowing section of whether or not correction is required is not limited to the correction rule associated with the first tag information. For the correction rule associated with the second tag information, whether or not correction is required may be selected.

In a case where the user selects whether or not correction is required, for each correction rule, by the above-described procedures, the selection operation receiving unit 26 receives the selection operation. Whether or not image correction to which the correction rule is applied is determined in accordance with the contents (simply, whether or not correction is required) of the selection operation received by the selection operation receiving unit 26.

In initial setting, for all correction rules associated with the first tag information, correction to which the correction rule is applied is performed. In a case where the unnecessary correction rule is excluded from application targets, the user performs the selection operation.

Correction Suggestion Unit

Figure 5:
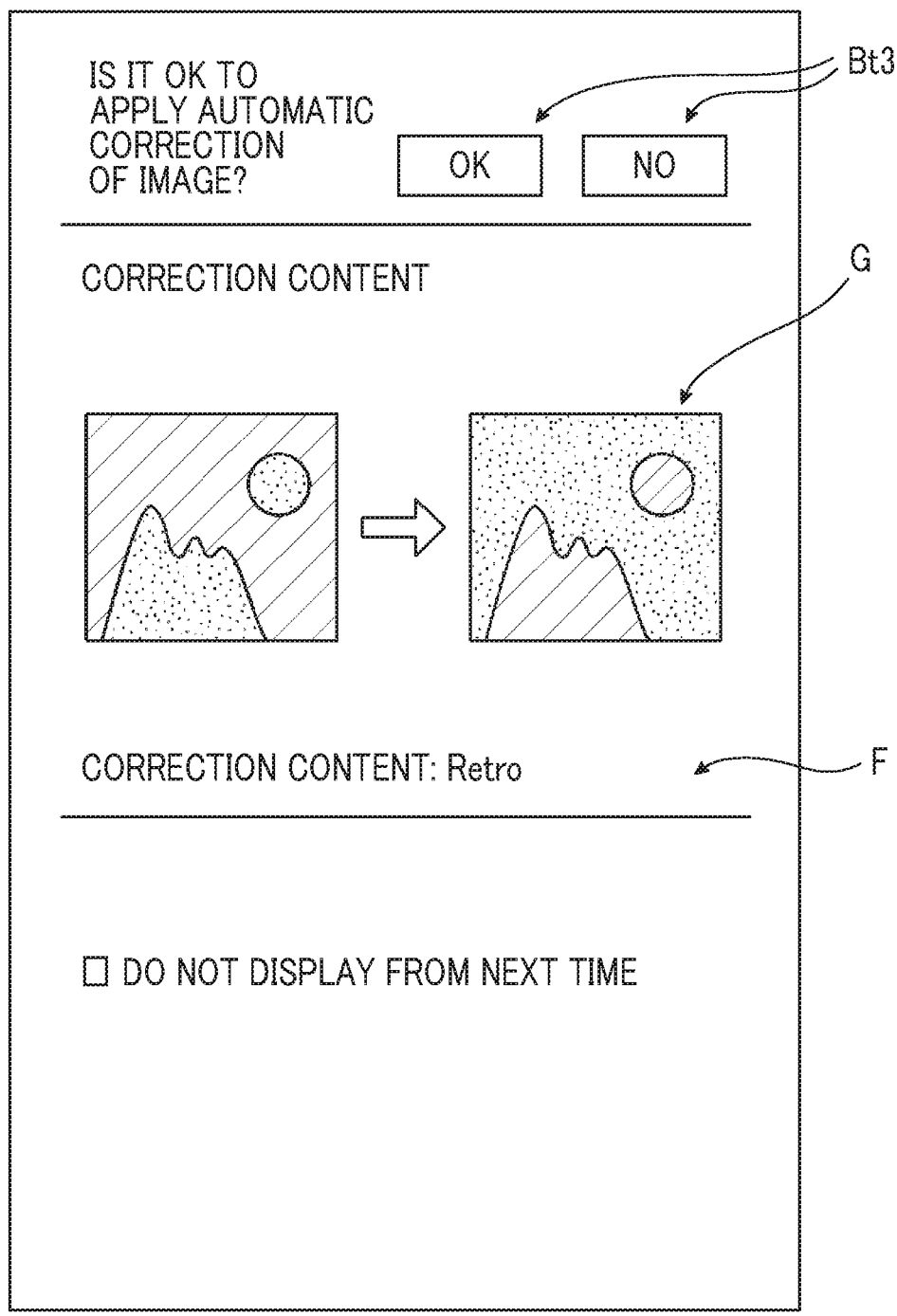
FIG. 5 is a diagram illustrating an example of a correction suggestion window.

In a case where the correction rule setting unit 23 automatically sets the correction rule, the correction suggestion unit 27 suggests correction of the input image, to which the correction rule is applied, to the user. Specifically, in a case where the correction suggestion unit 27 suggests image correction, the correction suggestion unit 27 displays a correction suggestion window illustrated in FIG. 5, in the display of the user terminal 11 in a pop-up manner. Strictly, the correction suggestion unit 27 generates data for displaying the correction suggestion window and transmits the data to the user terminal 11. The user terminal 11 receives the data via the network N and develops the received data. Thus, the correction suggestion window illustrated in FIG. 5 is displayed in the display of the user terminal 11 in an pop-up manner. FIG. 5 is a diagram illustrating an example of the correction suggestion window.

As illustrated in FIG. 5, character string information F indicating details of the correction rule set by the correction rule setting unit 23 for the input image, and a corrected image G in a case where the input image is corrected by applying the correction rule are displayed in the correction suggestion window. That is, the character string information F corresponding to the contents of the correction rule to be applied in correction and data for displaying the corrected image G are incorporated in display data of the correction suggestion window. In a case where the correction suggestion window is displayed in the display of the user terminal 11, the user views the character string information F and the corrected image G in the correction suggestion window. In this state, the user determines whether or not to permit correction of the input image and presses a permission determination button Bt3 on the setting screen in accordance with the determination result. Thus, data (referred to as permission determination data) indicating determination of whether or not the suggested correction is permitted is generated by the user terminal 11. Then, the permission determination data is transmitted from the user terminal 11 to the image processing apparatus 10. The correction suggestion unit 27 receives and analyzes the permission determination data, and thus recognizes whether or not the user permits the suggested correction of the image.

Image Correction Unit

The image correction unit 28 corrects the input image by applying the correction rule which has been set by the correction rule setting unit 23. In the embodiment, only in a case where the correction suggestion unit 27 confirms the permission of the user for image correction suggested by the correction suggestion unit 27 (that is, only in a case where the correction suggestion unit 27 receives permission determination data indicating that the correction is permitted), the image correction unit 28 performs image correction suggested by the correction suggestion unit 27.

The image corrected by the image correction unit 28, that is, the corrected image is accumulated in the database 12, in a state of being associated with the user who is the source of providing the image before the correction. In the embodiment, in a case where the input image is corrected, only the input image after the correction (that is, corrected image) is accumulated in the database 12. The embodiment is not limited thereto, and both the corrected image and the input image before the correction may be accumulated in the database 12.

In the embodiment, as described above, for each correction rule which is automatically set by the correction rule setting unit 23, the selection operation receiving unit 26 receives the selection operation of the user, which relates to whether or not correction is required. The image correction unit 28 performs or does not perform correction of the input image perform, in accordance with the contents (that is, whether or not correction is required) of the selection operation received by the selection operation receiving unit 26.

In detail, in a period in which the mode is the automatic mode, for the correction rule for which the selection operation receiving unit 26 receives the selection operation indicating that the correction is required, image correction to which the correction rule is applied is performed. For example, it is assumed that the user performs the selection operation (specifically, operation of setting the selection button Bt2 to be in an ON state) indicating that correction to which the correction rule is applied is required, for Correction rule "Dynamic" associated with the first tag information of "scenery", on the setting screen illustrated in FIG. 4. In this case, in a case where the first tag information assigned to the input image is "scenery", Correction rule "Dynamic" is set in the automatic mode. The image correction unit 28 performs correction of the input image by applying Correction rule "Dynamic".

Regarding Correction rule "Instant" associated with the first tag information of "food", it is assumed that a selection operation (specifically, operation of setting the selection button Bt2 to be in an OFF state) indicating that correction to which the correction rule is applied is not required is performed. In this case, in a case where the first tag information assigned to the input image is "food", Correction rule "Instant" is set in the automatic mode. However, the correction of the input image, in which Correction rule "Instant" is applied is automatically set not to be performed.

Correction Rule Addition Unit

The correction rule addition unit 29 adds a correction rule to be stored in the correction rule storage unit 24. Specifically, in a case where a predetermined condition is satisfied in a case where a certain user inputs (uploads) an image and individually designates the correction rule, the correction rule addition unit 29 stores a new pattern between the correction rule and the input image (strictly, tag information assigned to the input image), in the correction rule storage unit 24.

In more detail, it is assumed that, in a case where the mode is the manual mode, the correction rule setting unit 23 sets the correction rule in accordance with an instruction of the user, and the image correction unit 28 corrects the input image by applying the set correction rule. Here, the correction rule set in accordance with the instruction of the user is set to a target correction rule, and tag information (strictly, second tag information) assigned to the image corrected by applying the target correction rule is set to target tag information.

In a case where a combination of the target correction rule satisfying Condition 1 and the target tag information satisfying Condition 2 is obtained, the correction rule addition unit 29 associates the target correction rule and the target tag information with each other and stores the result of the association in the correction rule storage unit 24.

Condition 1: the number of a plurality of the images corrected by applying the same target correction rule is equal to or more than a threshold Condition 2: the number of times of assigning the same target tag information to the plurality of the images corrected by applying the target correction rule satisfying Condition 1 is equal to or more than the threshold Here, specific examples of Condition 1 and Condition 2 will be described. For example, it is assumed that the user A performs image input (uploading) plural times. Here, it is assumed that the same second tag information of "mountain" (corresponding to the target tag information) is assigned to the input image of each time. In a case of input image of each time, the user A designates Correction rule "Black&White" (corresponding to the target correction rule), and the input image of each time is corrected by applying Correction rule "Black&White". At this time, in a case where the number of times of performing correction in which the same Correction rule "Black&White" is applied, in other words, the number of images corrected by applying the same Correction rule "Black&White" is equal to or more than a threshold H (H is a natural number of 1 or more), Condition 1 described above is satisfied. In a case where the number of times of the same second tag information of "mountain" being assigned to the images corrected by applying the same Correction rule "Black&White" is equal to or more than the threshold H, Condition 2 described above is satisfied. In a case where both Conditions 1 and 2 are satisfied in the above case, the correction rule addition unit 29 associates Correction rule "Black&White" with the second tag information of "mountain" and stores the result of the association in the correction rule storage unit 24 as a new correction rule for the user A.

The threshold H may have a predetermined value (changing of the threshold H may not be possible), or may be appropriately changed. In the above-described case, the target tag information is set to the second tag information. However, the embodiment is not limited thereto, and the target tag information may be the first tag information.

Reverse Correction Unit

The reverse correction unit 30 performs reverse correction on the corrected image obtained in a manner that the image correction unit 28 performs correction by applying the correction rule, and thus restores the corrected image to the image before the correction. Specifically, the user can request correction retraction for the corrected image with the user terminal 11, after image correction is performed. In a case where the reverse correction unit 30 receives the request of correction retraction from the user terminal 11 via the network N, the reverse correction unit 30 extracts the corrected image as a target of reverse correction, from the database 12. The corrected image is stored in the database 12 along with information regarding the applied correction rule. In a case where extracting the corrected image as the target of reverse correction, the reverse correction unit 30 specifies the correction rule applied to the extracted corrected image. The reverse correction unit 30 performs image processing for restoring the corrected image to which the correction rule is applied, to the image before the correction, that is, performs reverse correction, based on the specified correction rule. The corrected image subjected to reverse correction is rewritten as the image before the correction, and is accumulated in the database 12.

Image Processing Method

Next, an image processing method according to the present invention will be described.

Figure 6:
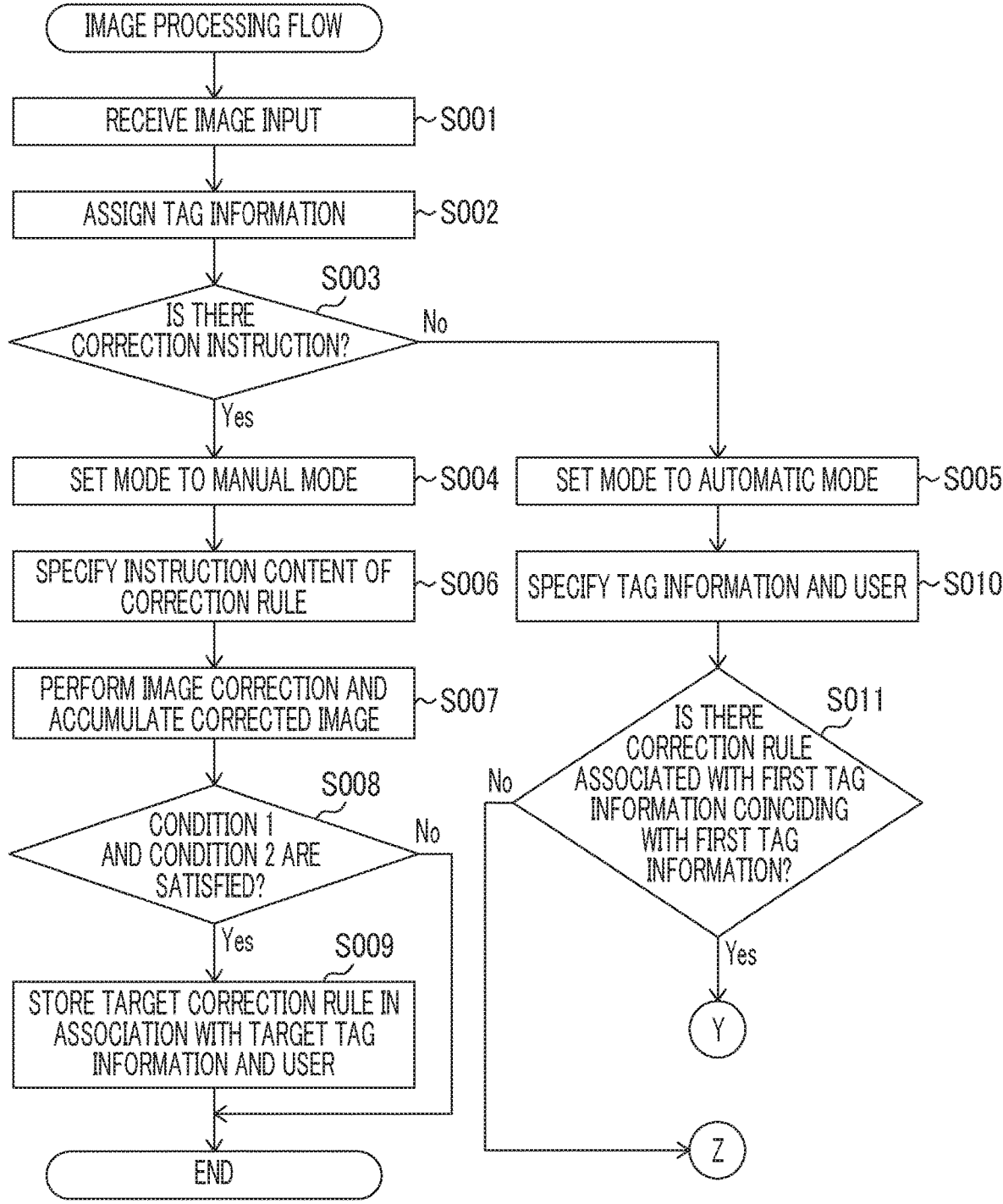
FIG. 6 is a diagram illustrating an image processing flow (part 1).
Figure 7:
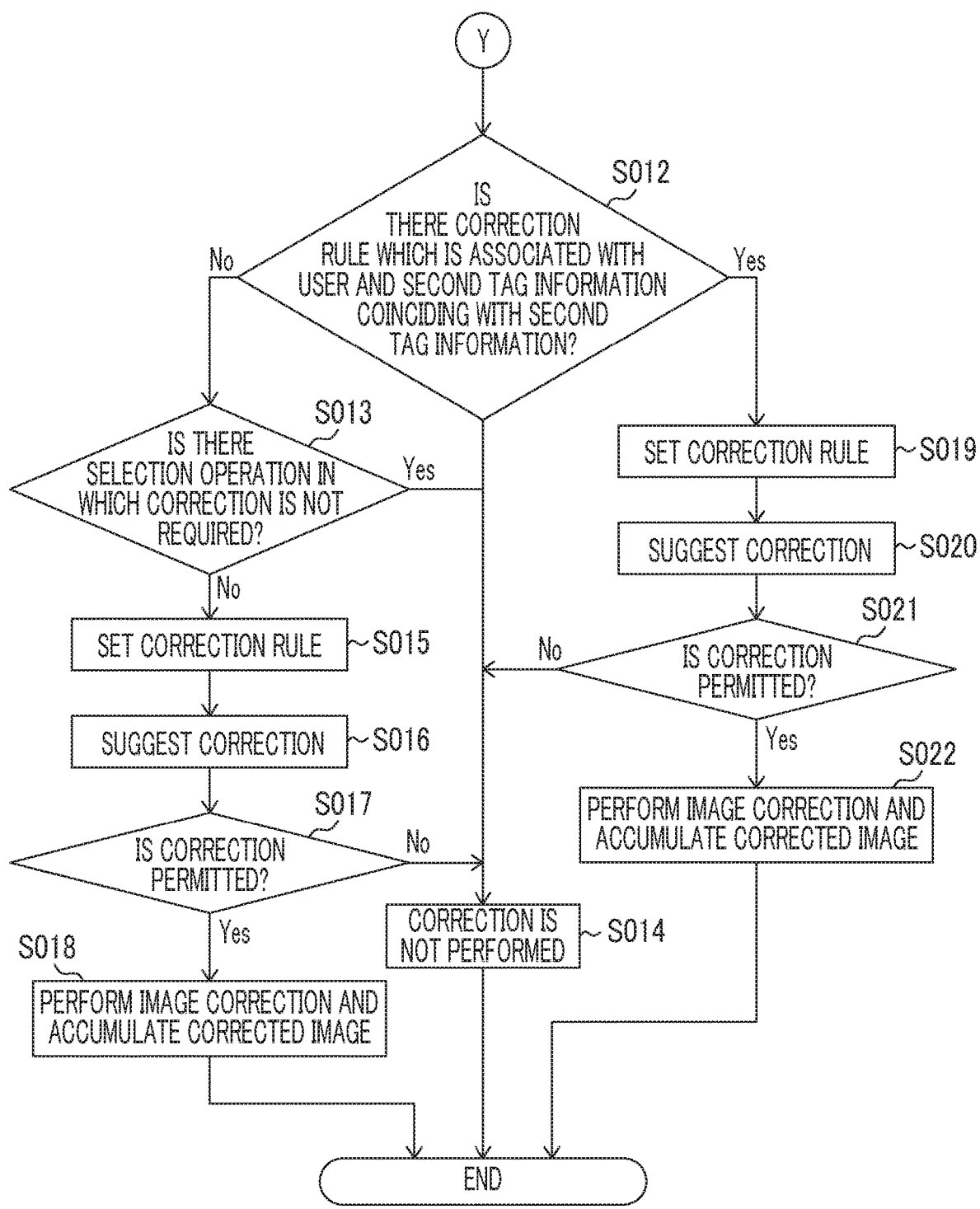
FIG. 7 is a diagram illustrating the image processing flow (part 2).
Figure 8:
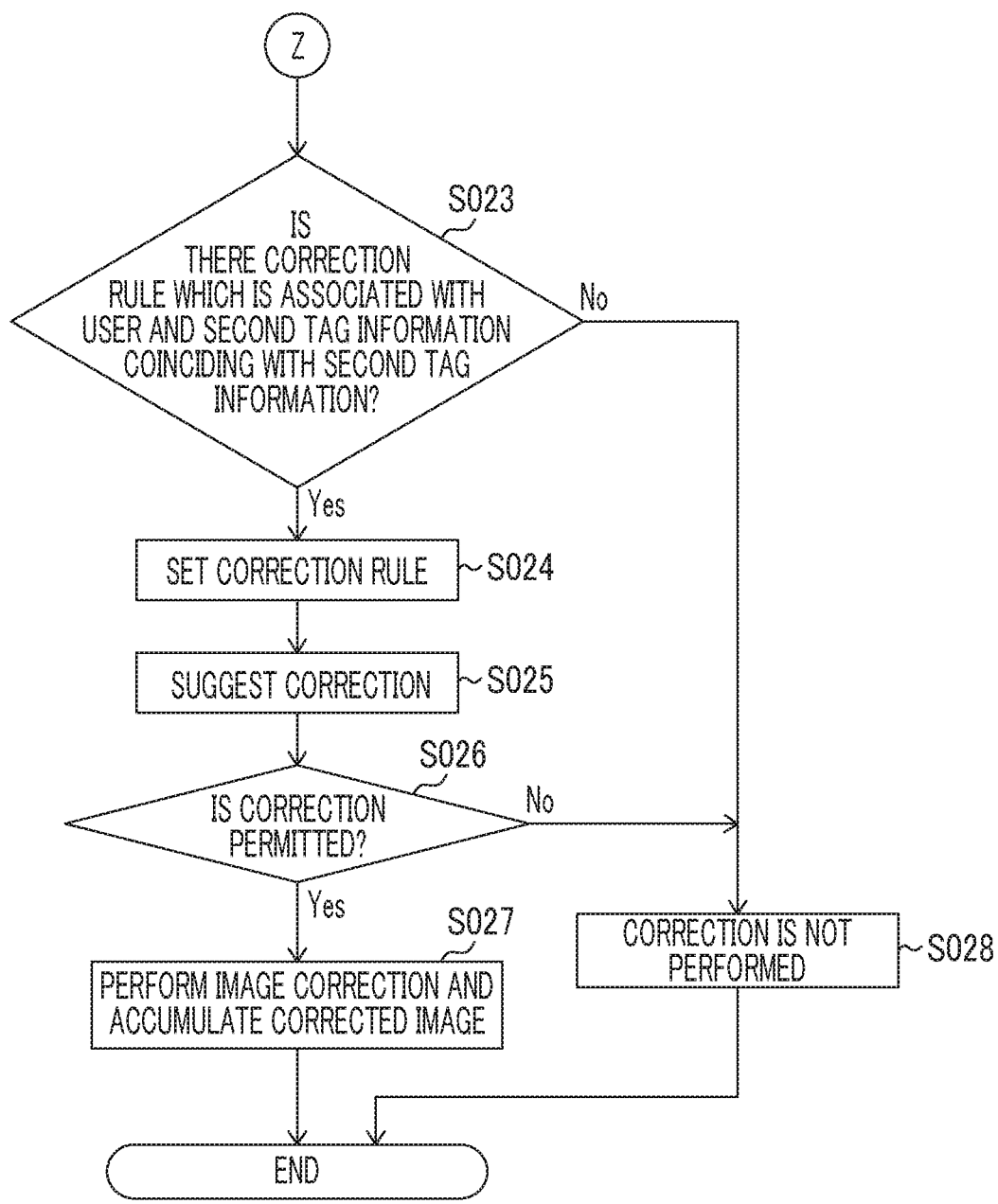
FIG. 8 is a diagram illustrating the image processing flow (part 3).

The image processing method in the present invention is applied in a data processing flow (hereinafter, image processing flow) realized by a computer 10a which constitutes the image processing apparatus 10 and is illustrated in FIG. 1 (simply referred to as "a computer 10a" below). The image processing flow proceeds with procedures illustrated in FIGS. 6 to 8. FIGS. 6 to 8 are diagrams illustrating the image processing flow.

The image processing flow as an operation example of an image processing system S will be described below. Descriptions will be made below focusing on processes performed by the computer 10a in the image processing flow. In the following descriptions, a screen displayed in the user terminal 11, that is, a graphical user interface (GUI) will be appropriately used as a reference.

Figure 9:
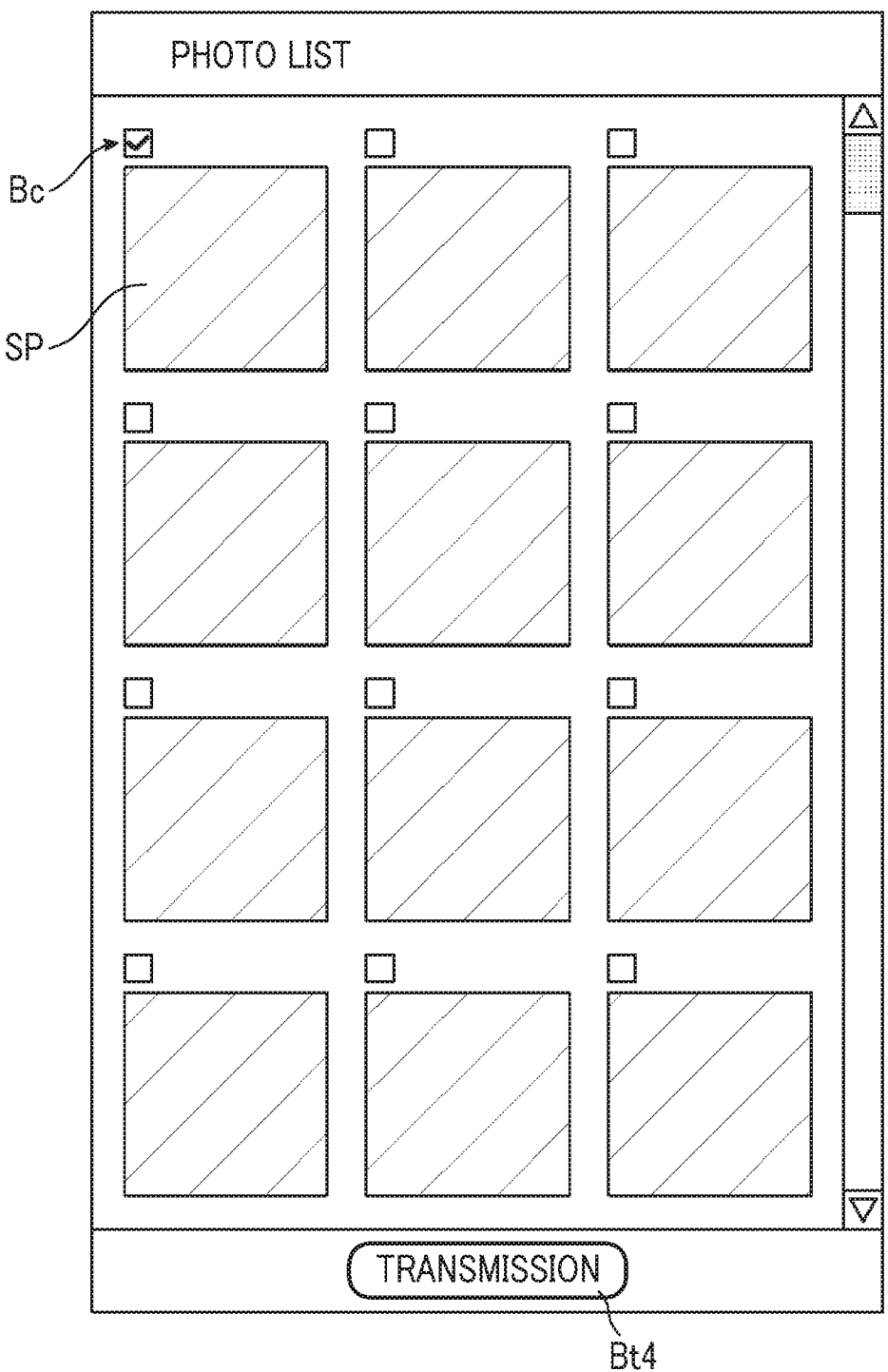
FIG. 9 is a diagram illustrating an example of an input screen.

In a case where the image processing flow starts, a user operates the user terminal 11 to start an application for image management. Thus, the main screen is drawn in the user terminal 11. The user performs a predetermined screen operation, thereby the main screen is switched to an input screen illustrated in FIG. 9. FIG. 9 is a diagram illustrating an example of the input screen.

As illustrated in FIG. 9, images stored in the user terminal 11, that is, thumbnail images SP (in FIG. 9, simply illustrated as diagonally hatched squares) of images as candidates to be input to the image processing apparatus 10 are displayed on the image input screen in a list. The user selects an image to be input (uploaded), puts a check in a check box Bc of the selected image, and then clicks an image transmission button Bt4 provided at the bottom of the image input screen. The user terminal 11 inputs (specifically, uploads) the image selected by the user to the computer 10a by performing such an operation.

The above-described application program for image management can interwork with a social network service (SNS). Thus, the user can log into the SNS by the application program for image management. After logging into the SNS, the user can post the image selected on the input screen in FIG. 9 onto the SNS by the similar procedure to the above-described procedure.

At a stage of inputting the selected image or posting the image onto the SNS, the user can request correction of the image and perform an instruction of the correction rule to be applied at time of correction. The contents of which an instruction is performed by the user with relating to the correction are digitized and transmitted from the user terminal 11 to the computer 10a.

In the computer 10a, the image input receiving unit 21 receives image input from the user terminal 11, specifically, receives the image input from the user terminal 11 via the network N (Step S001). In a case where the user logs into the SNS and posts the image selected on the input screen onto the SNS, the image input receiving unit 21 receives image input performed for a post onto the SNS (that is, uploading of the image to be posted).

In a case where the image input receiving unit 21 receives image input, this case acts as a trigger. Thus, the tag information assigning unit 22 analyzes an input image, specifies an object in the input image, and assigns first tag information and the second tag information corresponding to the specified object, to the input image (Step S002).

In a case where instruction information regarding correction at time of the image input is transmitted from the user terminal 11 (Yes in Step S003), the mode switching unit 25 in the computer 10a sets the mode to the manual mode (Step S004). In a case where the instruction information is not received (No in Step S003), the mode switching unit 25 sets the mode to the automatic mode (Step S005).

In a case where the mode is the manual mode, the correction rule setting unit 23 analyzes the instruction information and specifies the type of the correction rule of which the instruction has been performed by the user (Step S006). Then, the correction rule setting unit 23 sets the correction rule of the specified type, as a correction rule for the input image. For example, in a case where the user performs an instruction to apply Correction rule "Instant", the correction rule setting unit 23 sets Correction rule "Instant" as the correction rule for the input image.

Then, the image correction unit 28 corrects the input image by applying the correction rule set by the correction rule setting unit 23, and then accumulates the corrected image in the database 12 (Step S007). At this time, the corrected image is accumulated in the database 12 in association with the first tag information and the second tag information assigned to the input image in Step S002, and with the user who is the source of providing the image before the correction.

In a case where image correction is performed in a period in which the mode is the manual mode, the correction rule addition unit 29 performs predetermined determination processing by using the correction rule applied in the correction, as a target correction rule and using the tag information (strictly, second tag information) assigned to the corrected image as target tag information (Step S008). In the determination processing, the correction rule addition unit 29 determines whether or not the target correction rule satisfies Condition 1 described above, and the target tag information satisfies Condition 2 described above.

In a case where both Condition 1 and Condition 2 are satisfied, the correction rule addition unit 29 stores the target correction rule satisfying Condition 1, in the correction rule storage unit 24 in association with the target tag information satisfying Condition 2 and the user who is the source of providing the image (Step S009). At this time point, the image processing flow ends.

In a case where it is determined that at least one of Condition 1 or Condition 2 is not satisfied, in the determination processing, the image processing flow ends without performing Step S009.

Returning to Step S005, in a case where the mode is set to the automatic mode, the correction rule setting unit 23 automatically sets the correction rule for the input image by using reception of image input by the image input receiving unit 21 as a trigger. Specifically, the correction rule setting unit 23 specifies the user who is the source of providing the input image, and the first tag information and the second tag information which have been assigned to the input image in Step S002 (Step S010).

Then, the correction rule setting unit 23 determines whether a correction rule associated with first tag information coinciding with the first tag information specified in Step S010 is provided among correction rules stored in the correction rule storage unit 24 (Step S011). In a case where the correction rule associated with the coinciding first tag information is provided, the correction rule setting unit 23 sets the correction rule to be an application candidate (referred to as an application candidate associated with the first tag information, below).

The correction rule setting unit 23 specifies whether a correction rule which is associated with the user specified in Step S010 and is associated with second tag information coinciding with the second tag information specified in Step S010 is provided in the correction rules stored in the correction rule storage unit 24 (Step S012 in FIG. 7, Step S023 in FIG. 8). In a case were the correction rule associated with the user and the coinciding second tag information is provided, the correction rule setting unit 23 sets the correction rule to be an application candidate (referred to as an application candidate associated with the second tag information, below).

Here, it is assumed that only the application candidate associated with the first tag information is provided (that is, Yes in Step S011 and No in Step S012). In this case, the selection operation receiving unit 26 determines whether or not a selection operation of the user, which indicates that correction to which the correction rule is applied is not required, is received for the correction rule corresponding to the application candidate (Step S013).

In more detail, on the user terminal 11 side, the user may perform the selection operation on the setting screen illustrated in FIG. 4, in advance. In this case, the selection operation receiving unit 26 in the computer 10a receives the selection operation, strictly, receives data indicating the contents of the selection operation from the user terminal 11.

In a case where the selection operation receiving unit 26 receives the selection operation that correction is not required, for the correction rule corresponding to the application candidate associated with the first tag information (Yes in Step S013), correction to which the correction rule is applied is not performed (Step S014). In this case, the input image is accumulated in the database 12, in a state of not being corrected.

It is assumed that the selection operation receiving unit 26 does not receive the selection operation that correction is not required, for the correction rule corresponding to the application candidate associated with the first tag information (No in Step S013). In this case, the user determines that it is necessary that the image is corrected by applying the correction rule corresponding to the application candidate associated with the first tag information. Thus, the correction rule setting unit 23 sets the correction rule corresponding to the application candidate associated with the first tag information, as the correction rule for the input image (Step S015).

In a case where the correction rule setting unit 23 sets the correction rule, just after this case, the correction suggestion unit 27 in the computer 10a suggests, to the user, correction in which the correction rule set in previous Step S015 is applied (Step S016). In more detail, the correction suggestion unit 27 generates data for displaying the above-described check window in a pop-up manner and transmits the generated data to the user terminal 11. In a case where the data is received by the user terminal 11, the check window is displayed in a pop-up manner. Character string information F corresponding to the correction rule set in Step S015 and the corrected image G (strictly, reduced image of the corrected image G) in which the input image is corrected by applying the correction rule are displayed in the check window.

Two kinds of permission determination buttons Bt3 are provided in the check window. The user views the character string information F and the corrected image G, determines whether or not to permit the suggested correction, and clicks any one of the permission determination buttons Bt3. The user terminal 11 transmits data indicating the type of the permission determination button Bt3 clicked by the user (that is, determination result of the user, relating to whether or not correction is permitted). The correction suggestion unit 27 receives the data transmitted from the user terminal 11 and recognizes whether or not correction is performed, based on the data (Step S017).

In a case where the correction suggestion unit 27 recognizes that correction of the input image, which has been suggested by the correction suggestion unit 27, is permitted (Yes in Step S017), the image correction unit 28 performs correction of the input image, which has been suggested by the correction suggestion unit 27, that is, performs correction of the input image by applying the correction rule set in Step S015. Then, the image correction unit 28 accumulates the corrected image in the database 12 (Step S018). At this time, the corrected image is accumulated in the database 12 in association with the first tag information and the second tag information assigned to the input image in Step S002, and with the user who is the source of providing the image before the correction.

In a case where the correction suggestion unit 27 recognizes that the correction of the input image, which has been suggested by the correction suggestion unit 27, is not permitted (No in Step S017), the correction of the input image, which has been suggested by the correction suggestion unit 27, is not performed (Step S014). In this case, the input image is accumulated in the database 12, in a state of not being corrected.

The image processing flow ends at a time point at which the input image or the corrected image is accumulated in the database 12.

Returning to Step S012, it is assumed that both the application candidate associated with the first tag information and the application candidate associated with the second tag information are provided (that is, Yes in Step S011 and Yes in Step S012). In this case, the correction rule setting unit 23 preferentially applies the correction rule corresponding to the application candidate associated with the second tag information among the two application candidates and sets the correction rule as the correction rule for the input image (Step S019).

In a case where the correction rule setting unit 23 sets the correction rule, just after this case, the correction suggestion unit 27 suggests, to the user, correction of the input image, in which the correction rule set in previous Step S019 is applied (Step S020). A procedure of the suggestion is similar to Step S016. The user checks the contents of the suggested image correction through the check window which is displayed in the display of the user terminal 11 in a pop-up manner. The user determines whether or not the suggested correction is permitted and clicks the permission determination button Bt3 corresponding to the determination result. The user terminal 11 transmits data indicating the type of the clicked permission determination button Bt3. The correction suggestion unit 27 recognizes whether or not the correction is permitted, based on the data transmitted from the user terminal 11 (Step S021).

In a case where the correction of the input image, which has been suggested by the correction suggestion unit 27, is permitted (Yes in Step S021), the image correction unit 28 performs the correction of the input image, which has been suggested by the correction suggestion unit 27 (Step S022). The corrected image is accumulated in the database 12 in association with the first tag information and the second tag information assigned to the input image in Step S002 and with the user who is the source of providing the image before the correction.

In a case where the correction of the input image, which has been suggested by the correction suggestion unit 27, is not permitted (No in Step S021), the correction of the input image is not performed, and the input image is accumulated in the database 12 in a state of not being corrected (Step S014).

The image processing flow ends at a time point at which the input image or the corrected image is accumulated in the database 12.

Returning to Step S011, it is assumed that the application candidate associated with the first tag information is not provided, and only the application candidate associated with the second tag information is provided (that is, No in Step S011 and Yes in Step S023). In this case, the correction rule setting unit 23 sets the correction rule corresponding to the application candidate associated with the second tag information, as the correction rule for the input image (Step S024). Then, with procedures similar to Steps S020 to S022 described above, the image correction to which the set correction rule is applied is suggested (Step S025), and it is recognized whether or not the user permits the suggested image correction (Step S026). In a case where the correction is permitted, the suggested image correction is performed, and the corrected image is accumulated in the database 12 (Step S027). In a case where the suggested image correction is not permitted, the suggested image correction is not performed, and the input image is accumulated in the database 12 in a state of not being corrected (Step S028).

The image processing flow ends at a time point at which the input image or the corrected image is accumulated in the database 12.

As described above, according to the image processing method in the present invention, in a case where the user inputs (uploads) a captured image from the user terminal 11 to the image processing apparatus 10, and the image processing apparatus 10 receives image input, this acts as a trigger, and thus the tag information is assigned to the input image, and the correction rule is set based on the tag information. Correction of the input image, to which the set correction rule is applied is suggested to the user. Thus, it is possible to appropriately correct an image at a timing desirable in a relation with image input (uploading). In addition, the correction rule to be applied in image correction is appropriately set in accordance with an object in the input image.

As described above, the input (uploading) includes an input for a post onto the SNS. That is, according to the present invention, in a case where an image for a post onto the SNS is input (uploaded), this acts as a trigger, and thus the tag information is assigned, and setting of the correction rule and suggestion of the correction are performed. Thus, it is possible to appropriately correct an image to be open to the public by being posted onto the SNS, at a timing of the input (uploading). In addition, in the above-described case, an application (that is, application program for image management) using the image processing apparatus according to the present invention is set to interwork with an SNS application. That is, in the above case, the image processing apparatus according to the present invention mainly manages the input image and delivers an image to be opened to the public to the SNS application. In a case where an image is delivered to the SNS application, the image processing apparatus according to the present invention can set the correction rule for an image input for a post onto the SNS and can suggest image correction to which the correction rule is applied. At this time, the SNS application may be caused to read the correction rule set by the image processing apparatus according to the present invention, and may be caused to perform image correction, by using a transaction of the SNS application as a reference. In a case where the correction rule applied in this case and tag information assigned to a correction target image satisfy Condition 1 and Condition 2, the correction rule and the tag information can be stored in association with each other. Contents of the correction rule stored once can be appropriately updated.

In a case where the same tag information is assigned to the input image in the subsequent image posting, the input image may be corrected by applying the correction rule set by the image processing apparatus according to the present invention. Alternatively, in a case where an image is transferred to the SNS application, the correction rule to be applied may be also transmitted, and the SNS application may be caused to receive the correction rule. Thus, the SNS application may perform image correction.

The application itself (application program for image management) for using the image processing apparatus according to the present invention may be the SNS application.

The image processing method according to the present invention can be performed by a program (specifically, image processing program) causing a computer to perform the above steps, for example. A computer-readable recording medium in which the image processing program is recorded can be provided. As the recording medium, a magnetic disk such as a flexible disk; an optical disk such as a compact disk read only memory (CD-ROM), a digital versatile disc (DVD), and a Blu-ray disk (registered trademark), and a magneto-optical disk; and other removable media are exemplified. The image processing program may be stored in advance in a storage device configured by a magnetic disk, an optical disk, a magneto-optical disk, or the like, and the image processing program may be provided (downloaded) to a computer from the storage device via a communication line.

Modification Examples

In the above-described embodiment, uploading an image to the image processing apparatus 10 (including uploading for a post onto the SNS) is exemplified as an example of image input, and correction of an input image (uploaded image) is suggested at a timing of image uploading.

Image input is not limited to uploading to the image processing apparatus 10. For example, "image input" also includes a case where an image (hereinafter, shared image) shared with other users is designated from images accumulated in the database 12 after the uploading. A correction rule corresponding to a shared image may be set at a timing at which the shared image is designated, and image correction to which the correction rule is applied may be suggested.

An example (referred to as a modification example below) of suggesting image correction at a timing at which a shared image is designated will be described below.

The shared image is designated on a sharing setting screen which is displayed in the display of the user terminal 11 and is illustrated in FIG. 10. FIG. 10 is a diagram illustrating an example of the sharing setting screen. As illustrated in FIG. 10, thumbnail images SPx of images (strictly, uncorrected input images or corrected images) which have been previously uploaded to the image processing apparatus 10 by the user (owner of the user terminal 11) are displayed on the sharing setting screen in a list. In FIG. 10, the thumbnail images SPx are simply illustrated as diagonally hatched squares.

The user sets an image to be a shared image from an image group displayed on the sharing setting screen and puts a check in the check box Bc of the selected image. A field of setting a sharing range is provided on the sharing setting screen. The user can select candidates such as "specific user" and "all users" in a pull-down format for the sharing range. A field of inputting a user ID is provided on the sharing setting screen. In a case where "specific user" is set as the sharing range, the user can input an ID of the specific user. After the above series of settings are completed, the user clicks a share button Bt5 provided at the bottom of the sharing setting screen. The user terminal 11 transmits the shared image designated by the user and data indicating the sharing range and the like to the image processing apparatus 10 by performing such an operation.

In a case where the image processing apparatus 10 receives the data (that is, in a case where the image processing apparatus 10 receives image input), this acts as a trigger, and thus a series of processes relating to image correction are performed by procedures similar to those in the above-described embodiment. Specifically, the correction rule is set in accordance with the first tag information and the second tag information associated with the shared image, and image correction to which the set correction rule is applied is suggested to the user. In a case where it is recognized that the user permits the suggested image correction, the suggested image correction, that is, correction of the shared image by applying the set correction rule is performed. Thus, the shared image is rewritten to the corrected image and is subsequently accumulated in the database 12 after the correction.

As described above, since the shared image is corrected at a timing at which the shared image is designated, it can be examined whether or not image correction is required, in a case where the shared image is shared with other users. In a case where it is determined that correction is required, the shared image can be corrected, and thus the corrected shared image (corrected image) can be shared with other users.

Correction of the shared image is not limited to a case where the correction of the shared image is performed every time the shared image is designated. For example, correction of the shared image may be performed only in a case where a specific user is included in the sharing range or the shared image is opened to all users.

According to the present invention, an image processing apparatus includes an image input receiving unit that receives an input of an image captured by a user, a correction rule setting unit that sets a correction rule for the input image in accordance with supplementary information regarding the input image in a case where the image input receiving unit receives the input of the image, and a correction suggestion unit that suggests, to the user, correction of the image, to which the correction rule is applied, in a case where the correction rule setting unit sets the correction rule.

In the image processing apparatus configured as described above, in a case where the input of the image is received, the correction rule for the input image is set by using the case as a trigger, and the correction of the input image, to which the set correction rule is applied, is suggested. According to such a configuration, it is possible to appropriately correct an image at a more appropriate timing.

Here, preferably, the image processing apparatus further includes an image correction unit that performs the correction of the image, to which the correction rule is applied. Preferably, the correction suggestion unit recognizes whether or not the user permits the correction of the image, which has been suggested by the correction suggestion unit, and the image correction unit performs the correction of the image, which has been suggested by the correction suggestion unit, only in a case where the correction suggestion unit recognizes the permission of the user for the correction of the image, which has been suggested by the correction suggestion unit.

In this case, only in a case where the user permits the correction, image correction is performed. Thus, image correction with reflecting an intention of the user is performed.

In the image processing apparatus, preferably, in a case where the correction suggestion unit suggests, to the user, the correction of the image, to which the correction rule is applied, the correction suggestion unit displays a corrected image in a case where correction to which the correction rule is applied has been performed.

In this case, it is possible to cause the user to recognize correction details by viewing the corrected image.

In the image processing apparatus, preferably, in a case where the correction suggestion unit suggests, to the user, the correction of the image, to which the correction rule is applied, the correction suggestion unit displays character string information corresponding to contents of the correction rule.

In this case, it is possible to cause the user to recognize correction details by viewing the displayed character string information.

Preferably, the image processing apparatus further includes a tag information assigning unit that analyzes the input image to specify an object in the image and assigns tag information corresponding to the object to the input image as the supplementary information, wherein, in a case where the image input receiving unit receives the input of the image. Preferably, the correction rule setting unit sets the correction rule for the input image, in accordance with the tag information assigned to the input image.

In this case, the correction rule is set in accordance with the object in the image. Thus, it is possible to more appropriately perform image correction.

Preferably, the image processing apparatus further includes a correction rule storage unit that stores the correction rule which has been previously prepared, in association with the tag information. Preferably, the correction rule setting unit stores the correction rule associated with tag information which coincides with the tag information assigned to the input image among correction rules stored in the correction rule storage unit, as the correction rule for the input image.

In this case, a correction rule associated with the tag information assigned to the input image is selected among correction rules which have been previously prepared, and image correction by applying the selected correction rule is performed. Thus, it is possible to more smoothly perform image correction.

In the image processing apparatus, preferably, the tag information includes first tag information indicating attributes of the object and second tag information indicating attributes of the object, which are more specific than the first tag information. Preferably, the correction rule associated with the first tag information and the correction rule associated with the second tag information are stored in the correction rule storage unit.

In this case, regarding each of the first tag information and the second tag information, the correction rule is prepared. Thus, it is possible to set an appropriate correction rule in accordance with the type of tag information assigned to the input image.

In the image processing apparatus, preferably, in a case where both the first tag information and the second tag information are assigned to the input image, and each of the first tag information and the second tag information assigned to the input image coincides with the tag information associated with the correction rule stored in the correction rule storage unit, the correction rule setting unit sets the correction rule associated with the second tag information which coincides with the second tag information assigned to the input image among correction rules stored in the correction rule storage unit, as the correction rule for the input image.

In this case, in a case where both the correction rule associated with the first tag information and the correction rule associated with the second tag information are provided as candidates, the correction rule associated with the second tag information is preferentially employed. Thus, an appropriate correction rule is set in accordance with more specific contents of the object in the image. Thus, it is possible to more appropriately perform image correction.

In the image processing apparatus, preferably, the correction rule associated with the second tag information is stored in the correction rule storage unit for each user. In this case, since the correction rule associated with the second tag information is stored for each user, it is possible to set the correction rule with reflecting the interest, the preference, and the like of the user.

Preferably, the image processing apparatus further includes a mode switching unit that switches a mode in which the correction rule setting unit sets the correction rule. Preferably, the mode switching unit switches the mode between an automatic mode and a manual mode, the automatic mode in which the correction rule setting unit automatically sets the correction rule, and the manual mode in which the correction rule setting unit sets the correction rule in accordance with an instruction of the user. Preferably, in a case where the mode is the automatic mode, in a case where the tag information assigned to the input image coincides with the tag information associated with the correction rule stored in the correction rule storage unit, the correction rule setting unit sets the correction rule associated with the tag information which coincides with the tag information assigned to the input image among the correction rules stored in the correction rule storage unit, as the correction rule for the input image.

In this case, in a case where the mode turns into the automatic mode, the correction rule is automatically set in accordance with the tag information assigned to the input image. Thus, setting of the correction rule and image correction are more smoothly performed.

Preferably, the image processing apparatus further includes a correction rule addition unit that adds a correction rule to be stored in the correction rule storage unit. Preferably, in a case where the correction rule set by the correction rule setting unit in which the mode is the manual mode is set to a target correction rule, and the tag information assigned to the image corrected by applying the target correction rule is set to target tag information, the correction rule addition unit stores the target correction rule satisfying Condition 1, in the correction rule storage unit, in association with the target tag information satisfying Condition 2.

Condition 1: the number of a plurality of the images corrected by applying the same target correction rule is equal to or more than a threshold Condition 2: the number of times of assigning the same target tag information to the plurality of the images corrected by applying the target correction rule satisfying Condition 1 is equal to or more than the threshold In this case, in a case where the correction rule set by the user in a case where the mode is in the manual mode is applied predetermined times or more in correction of the image to which the same tag information is assigned, the correction rule is stored, and thus it is possible to use the correction rule in the subsequent image correction. Thus, it is possible to more smoothly image correction in which the correction rule desired by the user is applied.

Preferably, the image processing apparatus further includes a selection operation receiving unit that receives a selection operation of the user for whether or not correction to which the correction rule is applied is required, for each correction rule. Preferably, in a case where the selection operation receiving unit receives the selection operation indicating that the correction is not required, for the correction rule set by the correction rule setting unit, the correction of the image, in which the correction rule set by the correction rule setting unit is applied, is not performed.

In this case, regarding the correction rule selected by the user as no correction required, image correction to which this correction rule is applied is ignored. Thus, image correction based on the intention of the user is performed.

In the image processing apparatus, the image input receiving unit may receive the input of the image for a post on a social network service.

In this case, the input image is corrected in a case where the image for a post on the social network service is input. Thus, it is possible to cause the user to post the image corrected by applying the correction rule desired by the user on the social network service.

Preferably, the image processing apparatus further includes a reverse correction unit that restores the image corrected by applying the correction rule corresponding to the supplementary information, to the image before the correction.

In this case, it is possible to restore an image which has been corrected once, to an original state (image before correction). Thus, it is possible to restore the corrected image to the image before correction, in accordance with a request of the user.

EXPLANATION OF REFERENCES

10: image processing apparatus
10a: computer
11: user terminal
12: database
21: image input receiving unit
22: tag information assigning unit
23: correction rule setting unit
24: correction rule storage unit
25: mode switching unit
26: selection operation receiving unit
27: correction suggestion unit
28: image correction unit
29: correction rule addition unit
30: reverse correction unit
Bc: check box
Bt1: mode switching button
Bt2: selection button
Bt3: permission determination button
Bt4: image transmission button
Bt5: share button
F: character string information
G: corrected image
SP, SPx: thumbnail image
N: network

What is claimed is:
1. An image processing apparatus comprising:
an image input receiving unit that receives an input of an image captured by a user;
a supplemental information assigning unit that analyzes the input image to specify an object in the image and assigns supplemental information corresponding to the object in the input image, in a case where the image input receiving unit receives the input of the image;
a correction rule setting unit that sets a correction rule for the input image in accordance with the supplementary information regarding the input image, in a case where the image input receiving unit receives the input of the image;
a correction suggestion unit that suggests, to the user, correction of the image, to which the correction rule is applied, in a case where the correction rule setting unit sets the correction rule; and
a correction rule storage unit that stores the correction rule which has been previously prepared, in association with the supplemental information,
wherein the corrected images are different from the input images,
the correction rule setting unit sets the correction rule associated with the supplemental information which coincides with the supplemental information assigned to the input image among the correction rules stored in the correction rule storage unit, as the correction rule for the input image,
the supplemental information includes first tag information indicating attributes of the object and second tag information indicating attributes of the object, which are more specific than the first tag information,
the correction rule associated with the first tag information and the correction rule associated with the second tag information are stored in the correction rule storage unit, and
the correction rule associated with the second tag information is stored in the correction rule storage unit for each user.
2. The image processing apparatus according to claim 1, further comprising:
an image correction unit that performs the correction of the image, to which the correction rule is applied, wherein the correction suggestion unit recognizes whether or not the user permits the correction of the image, which has been suggested by the correction suggestion unit, and the image correction unit performs the correction of the image, which has been suggested by the correction suggestion unit, only in a case where the correction suggestion unit confirms the permission of the user for the correction of the image, which has been suggested by the correction suggestion unit.

3. The image processing apparatus according to claim 2, wherein, in a case where the correction suggestion unit suggests, to the user, the correction of the image, to which the correction rule is applied, the correction suggestion unit displays a corrected image in a case where correction is performed by applying the correction rule.

4. The image processing apparatus according to claim 2, further comprising:
a selection operation receiving unit that receives a selection operation of the user as to whether or not correction to which the correction rule is applied is required, for each correction rule,
wherein, in a case where the selection operation receiving unit receives the selection operation indicating that the correction is not required, for the correction rule set by the correction rule setting unit,
the correction of the image, in which the correction rule set by the correction rule setting unit is applied, is not performed.

5. The image processing apparatus according to claim 2, further comprising:
a reverse correction unit that restores the corrected image corrected by applying the correction rule corresponding to the supplementary information, to the image before the correction.

6. The image processing apparatus according to claim 1, wherein, in a case where the correction suggestion unit suggests, to the user, the correction of the image, to which the correction rule is applied, the correction suggestion unit displays a corrected image in a case where correction is performed by applying the correction rule.

7. The image processing apparatus according to claim 1, wherein, in a case where the correction suggestion unit suggests, to the user, the correction of the image, to which the correction rule is applied, the correction suggestion unit displays character string information corresponding to contents of the correction rule.

8. The image processing apparatus according to claim 1, wherein, in a case where both the first tag information and the second tag information are assigned to the input image, and each of the first tag information and the second tag information assigned to the input image coincides with the tag information associated with the correction rule stored in the correction rule storage unit, the correction rule setting unit sets the correction rule associated with the second tag information which coincides with the second tag information assigned to the input image among the correction rules stored in the correction rule storage unit, as the correction rule for the input image.

9. The image processing apparatus according to claim 1, further comprising:
a mode switching unit that switches a mode in which the correction rule setting unit sets the correction rule,
wherein the mode switching unit switches the mode between an automatic mode in which the correction rule setting unit automatically sets the correction rule and a manual mode in which the correction rule setting unit sets the correction rule in accordance with an instruction of the user, and
in a case where the mode is the automatic mode, in a case where the tag information assigned to the input image coincides with the tag information associated with the correction rule stored in the correction rule storage unit, the correction rule setting unit sets the correction rule associated with the tag information which coincides with the tag information assigned to the input image among the correction rules stored in the correction rule storage unit, as the correction rule for the input image.

10. The image processing apparatus according to claim 9, further comprising:
a correction rule addition unit that adds the correction rule to be stored in the correction rule storage unit,
wherein, in a case where the correction rule set by the correction rule setting unit, in which the mode is the manual mode, is set to a target correction rule, and the tag information assigned to the image corrected by applying the target correction rule is set to target tag information,
the correction rule addition unit stores the target correction rule satisfying Condition 1, in the correction rule storage unit, in association with the target tag information satisfying Condition 2,
Condition 1: the number of a plurality of the images corrected by applying the same target correction rule is equal to or more than a threshold
Condition 2: the number of times of assigning the same target tag information to the plurality of images corrected by applying the target correction rule satisfying Condition 1 is equal to or more than the threshold.

11. The image processing apparatus according to claim 1, wherein the image input receiving unit receives the input of the image for a post onto a social network service.

12. An image processing method of the image processing apparatus according to claim 1 comprising:
receiving the input of the image captured by the user, by the image input receiving unit;
setting the correction rule for the input image in accordance with the supplementary information regarding the input image by the correction rule setting unit in a case where the image input receiving unit receives the input of the image; and
suggesting, to the user, correction of the image, to which the correction rule is applied, by the correction suggestion unit in a case where the correction rule setting unit sets the correction rule.

13. The image processing method according to claim 12, further comprising:
performing the correction of the image, to which the correction rule is applied, by an image correction unit,
wherein, in the suggesting of the correction of the image, it is recognized whether or not the user permits the correction of the image, which has been suggested by the correction suggestion unit, and
only in a case where it is confirmed that the user permits the correction of the image, which has been suggested by the correction suggestion unit, the correction of the image, to which the correction rule is applied, is performed.

14. A non-transitory computer-readable recording medium which stores a program causing a computer to execute each step of the image processing method according to claim 12.

15. An image processing apparatus which comprises a processor,
wherein the processor is configured to:
receive an input of an image captured by a user,
analyze the input image to specify an object in the image and assign supplementary information corresponding to the object in the input image, in a case of receiving the input of the image,
set a correction rule for the input image in accordance with the supplementary information regarding the input image in the case of receiving the input of the image,
suggest, to the user, correction of the image, to which the correction rule is applied, in a case of setting the correction rule, and
store the correction rule which has been previously prepared, in association with the supplementary information,
wherein the corrected images are different from the input images,
the correction rule associated with the supplementary information which coincides with the supplementary information assigned to the input image is set, among the stored correction rules, as the correction rule for the input image,
the supplementary information includes first tag information indicating attributes of the object and second tag information indicating attributes of the object, which are more specific than the first tag information,
the correction rule associated with the first tag information and the correction rule associated with the second tag information are stored, and
the correction rule associated with the second tag information is stored for each user.

* * * * *